United States Patent
Sai et al.

(10) Patent No.: US 11,859,871 B2
(45) Date of Patent: Jan. 2, 2024

(54) GEOTHERMAL HEAT UTILIZATION SYSTEM AND OPERATION METHOD FOR GEOTHERMAL HEAT UTILIZATION SYSTEM

(71) Applicants: MITSUBISHI HEAVY INDUSTRIES THERMAL SYSTEMS, LTD., Tokyo (JP); UNIVERSITY PUBLIC CORPORATION OSAKA, Osaka (JP)

(72) Inventors: Rinnichi Sai, Tokyo (JP); Masanobu Sakai, Tokyo (JP); Toru Yamaguchi, Tokyo (JP); Masaki Nakao, Osaka (JP); Yasuhisa Nakaso, Osaka (JP)

(73) Assignees: MITSUBISHI HEAVY INDUSTRIES THERMAL SYSTEMS, LTD., Tokyo (JP); UNIVERSITY PUBLIC CORPORATION OSAKA, Osaka (JP)

( * ) Notice: Subject to any disclaimer, the term of this patent is extended or adjusted under 35 U.S.C. 154(b) by 473 days.

(21) Appl. No.: 17/276,371

(22) PCT Filed: Sep. 19, 2019

(86) PCT No.: PCT/JP2019/036722
§ 371 (c)(1),
(2) Date: Mar. 15, 2021

(87) PCT Pub. No.: WO2020/059788
PCT Pub. Date: Mar. 26, 2020

(65) Prior Publication Data
US 2022/0034552 A1 Feb. 3, 2022

(30) Foreign Application Priority Data

Sep. 20, 2018 (JP) .................................. 2018-175985

(51) Int. Cl.
*F24T 10/20* (2018.01)
*F24T 10/13* (2018.01)

(52) U.S. Cl.
CPC .............. *F24T 10/20* (2018.05); *F24T 10/13* (2018.05)

(58) Field of Classification Search
CPC ....... F24T 10/13; F24T 10/20; F24T 2010/56; Y02B 10/40; Y02B 10/10
See application file for complete search history.

(56) References Cited

U.S. PATENT DOCUMENTS 2,461,449 A * 2/1949 Smith ...................... F24T 10/30
166/57
4,157,730 A * 6/1979 Despois .............. F28D 20/0056
165/45

(Continued)

FOREIGN PATENT DOCUMENTS

JP 9-280689 A 10/1997

OTHER PUBLICATIONS

Written Opinion of the International Searching Authority and International Search Report, daled Dec. 3, 2019, for International Application No. PCT/JP2019/036722, with English translations.

*Primary Examiner* — Nelson J Nieves
(74) *Attorney, Agent, or Firm* — Birch, Stewart, Kolasch & Birch, LLP

(57) ABSTRACT

The geothermal heat utilization system is capable of supplying underground water of an upper aquifer from the first upper opening to the second upper opening via the first pipe, and capable of supplying underground water of a lower aquifer from the second lower opening to the first lower opening via the second pipe. Further, the geothermal heat utilization system is configured to pump hot water and at the same time, pump cold water.

11 Claims, 24 Drawing Sheets

(56) References Cited

U.S. PATENT DOCUMENTS

| | | | | |
|---|---|---|---|---|
| 4,200,152 A * | 4/1980 | Foster | ................... | E21B 43/283 |
| | | | | 166/308.1 |
| 4,201,060 A * | 5/1980 | Outmans | ................... | F03G 7/04 |
| | | | | 165/45 |
| 4,223,729 A * | 9/1980 | Foster | .................... | E21B 43/17 |
| | | | | 166/250.1 |
| 4,448,237 A * | 5/1984 | Riley | ................... | F24D 11/0214 |
| | | | | 165/45 |
| 8,881,805 B2 * | 11/2014 | Klemencic | .............. | F24T 10/20 |
| | | | | 166/245 |
| 9,080,441 B2 * | 7/2015 | Meurer | .............. | E21B 43/2401 |
| 9,518,787 B2 * | 12/2016 | Pilebro | .................... | F24D 3/08 |
| 10,054,372 B2 * | 8/2018 | Vendeirinho | ......... | F24D 11/006 |
| 10,107,563 B2 * | 10/2018 | Bergan | ................... | F24S 60/30 |
| 11,624,510 B2 * | 4/2023 | Rosén | ................... | F24F 5/0046 |
| | | | | 165/45 |
| 2006/0048770 A1 * | 3/2006 | Meksvanh | .............. | F24T 10/20 |
| | | | | 126/620 |
| 2011/0082592 A1 * | 4/2011 | Saito | ....................... | F24T 10/20 |
| | | | | 454/239 |
| 2012/0198844 A1 * | 8/2012 | Kaminsky | ............... | F24T 10/20 |
| | | | | 165/45 |
| 2013/0056171 A1 * | 3/2013 | Klemencic | .............. | F24T 10/30 |
| | | | | 165/45 |
| 2013/0299123 A1 * | 11/2013 | Matula | ................... | F25D 17/00 |
| | | | | 165/45 |
| 2015/0292809 A1 * | 10/2015 | Pilebro | .............. | F28D 20/0039 |
| | | | | 165/10 |
| 2018/0283799 A1 * | 10/2018 | Sakai | ...................... | F24F 11/30 |
| 2021/0164708 A1 * | 6/2021 | Niemi | .................... | F24T 10/17 |
| 2021/0332683 A1 * | 10/2021 | Hunter | .................. | E21B 47/003 |

* cited by examiner

GEOTHERMAL HEAT UTILIZATION SYSTEM AND OPERATION METHOD FOR GEOTHERMAL HEAT UTILIZATION SYSTEM

TECHNICAL FIELD

The present invention relates to a geothermal heat utilization system and an operation method for a geothermal heat utilization system.

Priority is claimed on Japanese Patent Application No. 2018-175985, filed Sep. 20, 2018, the content of which is incorporated herein by reference.

BACKGROUND ART

In recent years, a geothermal heat utilization system that pumps up underground water in an aquifer from a well and uses the underground water as a hot heat source or a cold heat source has been proposed.

In the related art, Patent Literature 1 discloses a geothermal heat utilization system that takes in underground water from an upper aquifer and circulates the underground water to a lower aquifer in an opening of a well.

CITATION LIST

Patent Literature

[Patent Literature 1]
Japanese Unexamined Patent Application, First Publication No. H09-280689

SUMMARY OF INVENTION

Technical Problem

However, in a case in which the quality of the underground water in the upper aquifer and the quality of the underground water in the lower aquifer are different, when the geothermal heat utilization system as in Patent Literature 1 is used, the underground water in the upper aquifer and the underground water in the lower aquifer are mixed with each other. When the underground water in the upper aquifer and the underground water in the lower aquifer are mixed with each other, the resulting reactants may block the opening of the well.

An object of the present invention is to provide a geothermal heat utilization system and an operation method for a geothermal heat utilization system in which blockage of the well can be prevented when the upper aquifer and the lower aquifer are used.

Solution to Problem

A geothermal heat utilization system according to a first aspect includes a first well that includes a first upper opening that opens in an upper aquifer and a first lower opening that opens in a lower aquifer; a second well that includes a second upper opening that opens in the upper aquifer and a second lower opening that opens in the lower aquifer; a first pipe; a second pipe; a first heat exchanger connected to the first pipe; and a second heat exchanger connected to the second pipe, wherein the geothermal heat utilization system is capable of supplying underground water of the upper aquifer from the first upper opening to the second upper opening via the first pipe, wherein the geothermal heat utilization system is capable of supplying underground water of the lower aquifer from the second lower opening to the first lower opening via the second pipe, and wherein the geothermal heat utilization system is configured to pump hot water as the underground water to be supplied from one of the upper aquifer and the lower aquifer, and at the same time, pump cold water as the underground water to be supplied from the other of the upper aquifer and the lower aquifer.

According to the present aspect, the underground water of the upper aquifer and the underground water of the lower aquifer can be supplied separately, and thus it is possible to prevent the underground water of the upper aquifer and the underground water of the lower aquifer from being mixed with each other.

Thus, in the geothermal heat utilization system of the present aspect, blockage of the well is prevented when the upper aquifer and the lower aquifer are used.

Further, the geothermal heat utilization system of the present aspect pumps the hot water from one of the upper aquifer and the lower aquifer, and at the same time, pumps the cold water from the other of the upper aquifer and the lower aquifer. Therefore, the hot water and the cold water can be used at the same time.

A geothermal heat utilization system according to a second aspect is the geothermal heat utilization system according to the first aspect which further includes a heater connected to the first heat exchanger; and a cooler connected to the second heat exchanger.

According to the present aspect, heating and cooling can be performed at the same time.

A geothermal heat utilization system according to a third aspect is the geothermal heat utilization system according to the first or second aspect, wherein the geothermal heat utilization system is further capable of supplying the underground water of the upper aquifer from the second upper opening to the first upper opening via the second pipe, and wherein the geothermal heat utilization system is further capable of supplying the underground water of the lower aquifer from the first lower opening to the second lower opening via the first pipe.

According to the present aspect, it is possible to reversely supply the heat stored by water supplying in each of the upper aquifer and the lower aquifer. Therefore, the heat stored by water supplying can be used.

A geothermal heat utilization system according to a fourth aspect is the geothermal heat utilization system according to any one of the first to third aspects, wherein the first well further includes a first storage unit provided above the first upper opening and including a first pump, and a first switching unit capable of switching between a mode for connecting the first storage unit and the first upper opening and a mode for connecting the first storage unit and the first lower opening, and wherein the second well further includes a second storage unit provided above the second upper opening and including a second pump, and a second switching unit capable of switching between a mode for connecting the second storage unit and the second upper opening and a mode for connecting the second storage unit and the second lower opening.

According to the present aspect, the first pump can pump the underground water of the upper aquifer and the underground water of the lower aquifer. Similarly, according to the present aspect, the second pump can pump the underground water of the upper aquifer and the underground water of the lower aquifer. Therefore, the utilization efficiency of the pump in each well can be improved.

A geothermal heat utilization system according to a fifth aspect is the geothermal heat utilization system according to any one of the first to third aspects, wherein the first pipe includes a first pumping pipe extending into the first well at a first end, wherein the second pipe includes a second pumping pipe extending into the second well at a first end, wherein the first pipe includes a first water injection pipe extending into the second well at a second end, wherein the second pipe includes a second water injection pipe extending into the first well at a second end, wherein each pumping pipe of the first pumping pipe and the second pumping pipe includes an upper pumping port that opens such that the geothermal heat utilization system is capable of pumping water from the upper aquifer, a first opening and closing cylinder capable of opening and closing the upper pumping port, a lower pumping port that opens such that the geothermal heat utilization system is capable of pumping water from the lower aquifer, and a second opening and closing cylinder capable of opening and closing the lower pumping port, and wherein each water injection pipe of the first water injection pipe and the second water injection pipe includes an upper water injection port that opens such that the geothermal heat utilization system is capable of injecting water into the upper aquifer, a third opening and closing cylinder capable of opening and closing the upper water injection port, a lower water injection port that opens such that the geothermal heat utilization system is capable of injecting water into the lower aquifer, and a fourth opening and closing cylinder capable of opening and closing the lower water injection port.

According to the present aspect, in each well of the first well and the second well, each of the upper pumping port, the lower pumping port, the upper water injection port, and the lower water injection port is opened and closed by each opening and closing cylinder.

Therefore, the mechanism in each well can be made compact.

A geothermal heat utilization system according to a sixth aspect is the geothermal heat utilization system according to the fifth aspect which further includes an interlocking mechanism configured to interlock a pair of the first opening and closing cylinder and the second opening and closing cylinder with a pair of the third opening and closing cylinder and the fourth opening and closing cylinder.

According to the present aspect, since the geothermal heat utilization system has the interlocking mechanism, it is possible to interlock the opening and closing operation of the upper pumping port and the lower pumping port with the opening and closing operation of the upper water injection port and the lower water injection port.

A geothermal heat utilization system according to a seventh aspect is the geothermal heat utilization system according to the fifth aspect which includes a first weight that hangs from a pair of the first opening and closing cylinder and the second opening and closing cylinder; and a second weight that hangs from a pair of the third opening and closing cylinder and the fourth opening and closing cylinder.

According to the present aspect, in the geothermal heat utilization system, the pair of the first opening and closing cylinder and the second opening and closing cylinder are pulled downward with the gravity on the first weight. Further, the pair of the third opening and closing cylinder and the fourth opening and closing cylinder are pulled downward with the gravity on the second weight.

Therefore, in the geothermal heat utilization system, it is easy to move each pair of the opening and closing cylinders of the pair of the first opening and closing cylinder and the second opening and closing cylinder and the pair of the third opening and closing cylinder and the fourth opening and closing cylinder downward.

A geothermal heat utilization system according to an eighth aspect is the geothermal heat utilization system according to the seventh aspect which further includes a lift mechanism that lifts the pair of the first opening and closing cylinder and the second opening and closing cylinder together with the pair of the third opening and closing cylinder and the fourth opening and closing cylinder.

According to the present aspect, in the geothermal heat utilization system, it is possible to interlock the opening and closing operation of the upper pumping port and the lower pumping port with the opening and closing operation of the upper water injection port and the lower water injection port by lifting the pair of the first opening and closing cylinder and the second opening and closing cylinder together with the pair of the third opening and closing cylinder and the fourth opening and closing cylinder.

Therefore, in the geothermal heat utilization system, the mechanism for performing each opening and closing operation can be simplified.

A geothermal heat utilization system according to a ninth aspect is the geothermal heat utilization system according to the fifth aspect which further includes a first cylinder capable of sliding a pair of the first opening and closing cylinder and the second opening and closing cylinder, and a second cylinder capable of sliding a pair of the third opening and closing cylinder and the fourth opening and closing cylinder.

According to the present aspect, the first cylinder can move the pair of the first opening and closing cylinder and the second opening and closing cylinder up and down with a driving force of the first cylinder. Further, the second cylinder can move the pair of the third opening and closing cylinder and the fourth opening and closing cylinder up and down with a driving force of the second cylinder.

Therefore, in the geothermal heat utilization system, it is easy to move each pair of the opening and closing cylinders of the pair of the first opening and closing cylinder and the second opening and closing cylinder and the pair of the third opening and closing cylinder and the fourth opening and closing cylinder downward.

A geothermal heat utilization system according to a tenth aspect is the geothermal heat utilization system according to the fifth aspect which includes a first drive mechanism capable of sliding the first opening and closing cylinder; a second drive mechanism capable of sliding the second opening and closing cylinder; a third drive mechanism capable of sliding the third opening and closing cylinder; and a fourth drive mechanism capable of sliding the fourth opening and closing cylinder.

Therefore, according to the present aspect, it is possible to move each opening and closing cylinder of the first opening and closing cylinder, the second opening and closing cylinder, the third opening and closing cylinder, and the fourth opening and closing cylinder up and down with a driving force of each drive mechanism.

Therefore, in the geothermal heat utilization system, it is easy to move each pair of the opening and closing cylinders of the pair of the first opening and closing cylinder and the second opening and closing cylinder and the pair of the third opening and closing cylinder and the fourth opening and closing cylinder downward.

An operation method for a geothermal heat utilization system according to a eleventh aspect is provided, the system including a first well that includes a first upper opening that opens in an upper aquifer and a first lower opening that opens in a lower aquifer; a second well that includes a second upper opening that opens in the upper aquifer and a second lower opening that opens in the lower aquifer; a first pipe; a second pipe; a first heat exchanger connected to the first pipe; and a second heat exchanger connected to the second pipe, the method including a step of supplying underground water of the upper aquifer from the first upper opening to the second upper opening via the first pipe; and a step of supplying underground water of the lower aquifer from the second lower opening to the first lower opening via the second pipe, wherein hot water as the underground water to be supplied from one of the upper aquifer and the lower aquifer is pumped, and at the same time, cold water as the underground water to be supplied from the other of the upper aquifer and the lower aquifer is pumped.

According to the present aspect, the underground water of the upper aquifer and the underground water of the lower aquifer can be supplied separately, and thus it is possible to prevent the underground water of the upper aquifer and the underground water of the lower aquifer from being mixed with each other.

Thus, in the operation method for a geothermal heat utilization system of the present aspect, blockage of the well is prevented when the upper aquifer and the lower aquifer are used.

Further, in the operation method of the present aspect, the hot water from one of the upper aquifer and the lower aquifer is pumped, and at the same time, the cold water from the other of the upper aquifer and the lower aquifer is pumped. Therefore, the hot water and the cold water can be used at the same time.

Advantageous Effects of Invention

In the geothermal heat utilization system and the operation method for a geothermal heat utilization system of the present invention, blockage of the well is prevented when the upper aquifer and the lower aquifer are used.

DESCRIPTION OF EMBODIMENTS

Figure 1:
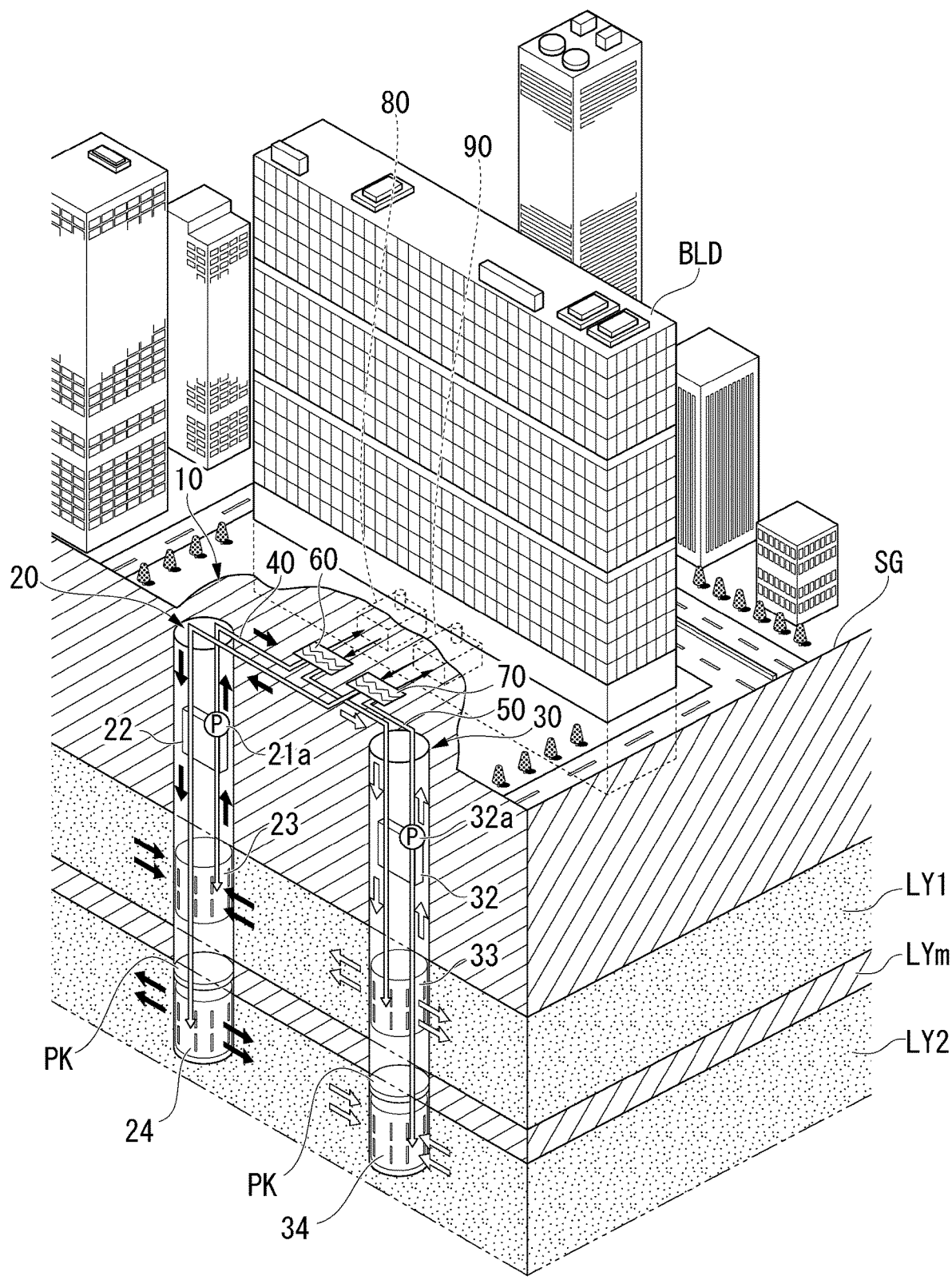
FIG. 1 is a perspective view of a geothermal heat utilization system according to a first embodiment.

Hereinafter, embodiments according to the present invention will be described using the accompanying drawings. The same or corresponding configurations are designated by the same reference numerals in all drawings, and common description will be omitted.

First Embodiment

A first embodiment of a geothermal heat utilization system will be described with reference to FIGS. 1 to 3.

Figure 2:
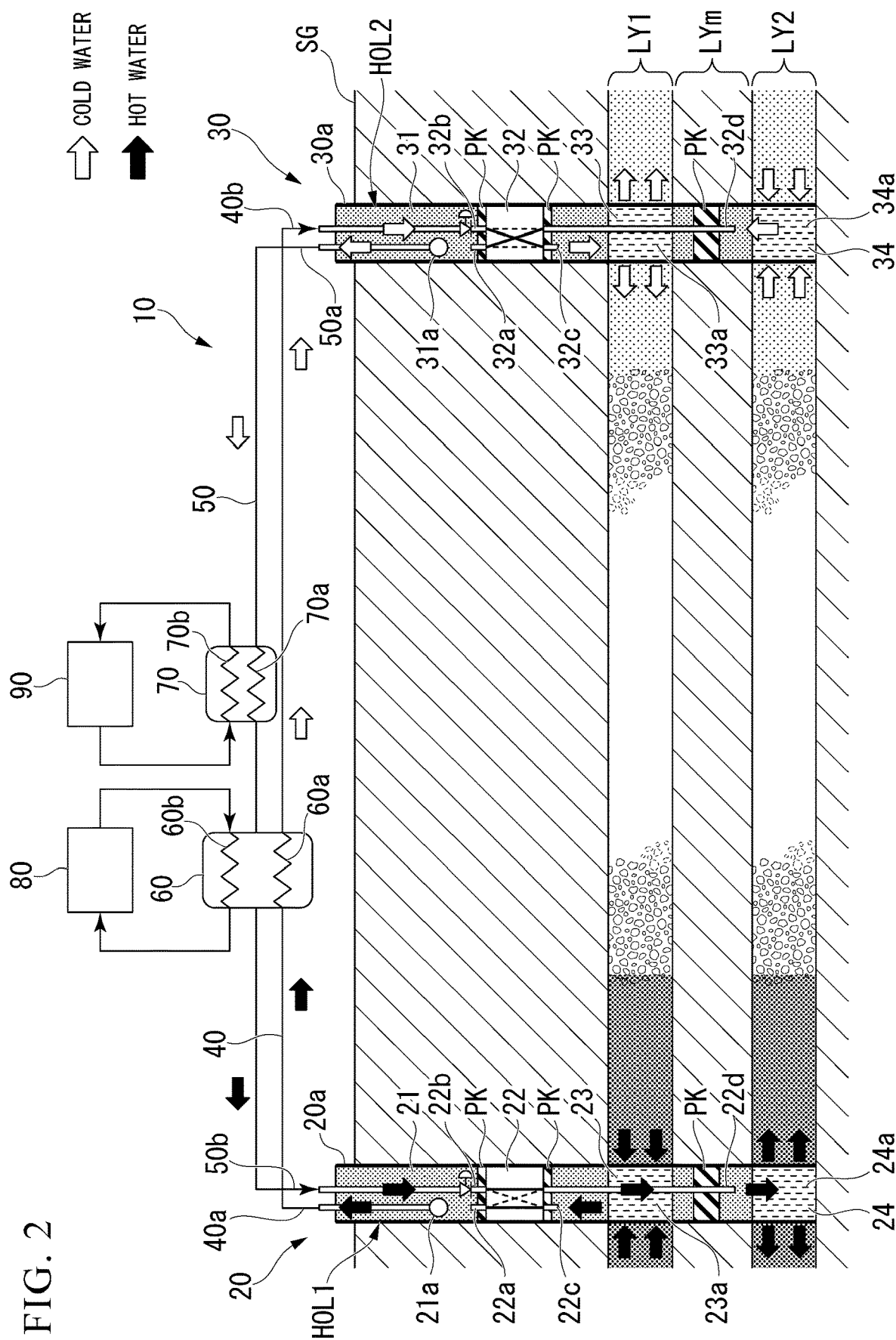
FIG. 2 is a system diagram of the geothermal heat utilization system according to the first embodiment.
Figure 3:
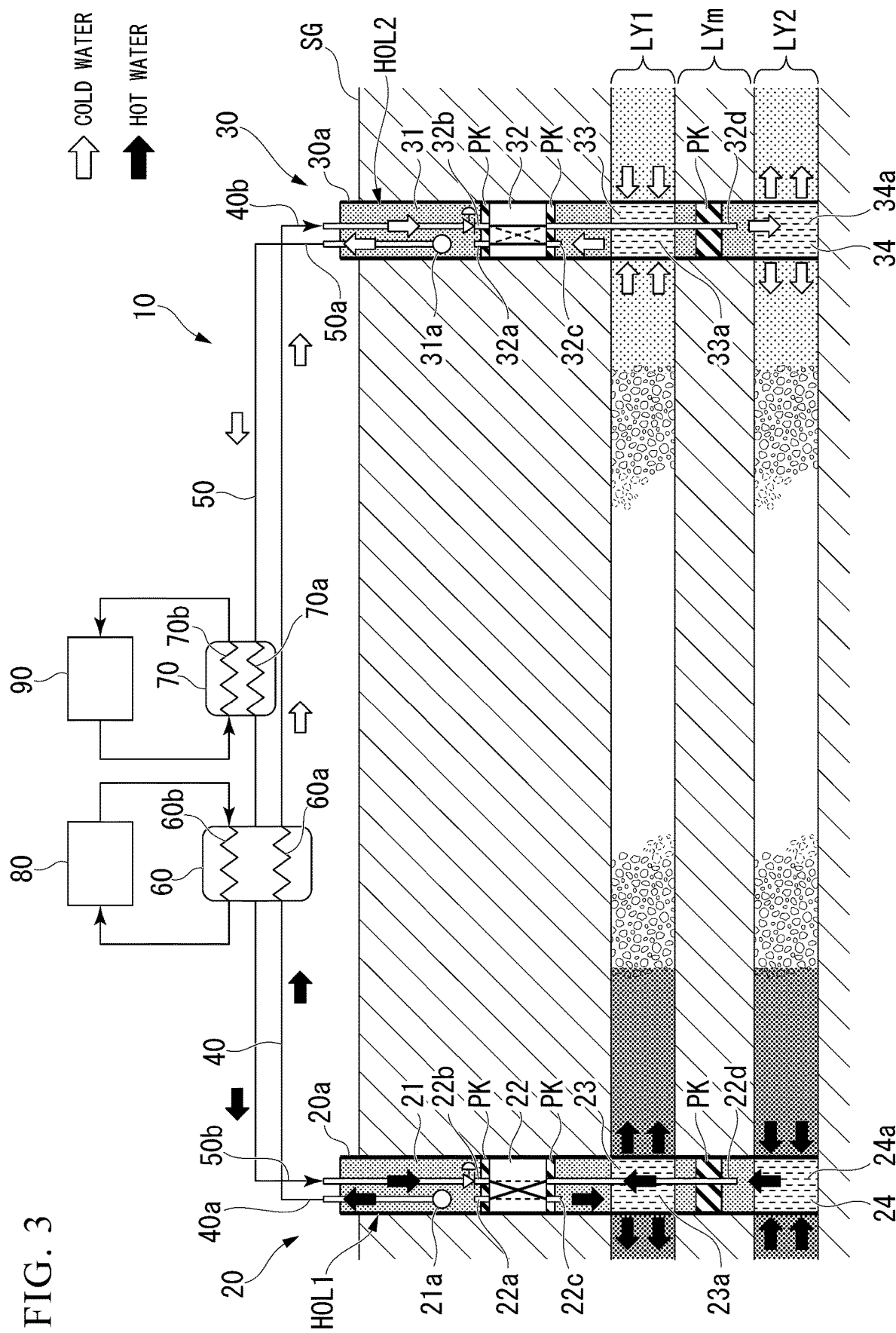
FIG. 3 is a system diagram of the geothermal heat utilization system according to the first embodiment.

In FIGS. 1 to 3, the arrows indicate the flow of a heat medium (including underground water) in each portion.

White arrows indicate cold water, and black arrows indicate hot water.

(Configuration of Geothermal Heat Utilization System)

A geothermal heat utilization system 10 stores heat in two different aquifers, an upper aquifer LY1 and a lower aquifer LY2. The upper aquifer LY1 and the lower aquifer LY2 are formed, for example, with a diluvial clay layer LYm interposed therebetween.

As shown in FIG. 1, the geothermal heat utilization system 10 includes a first well 20 and a second well 30.

The geothermal heat utilization system 10 further includes a first pipe 40, a second pipe 50, a first heat exchanger 60, and a second heat exchanger 70.

The geothermal heat utilization system 10 further includes a heater 80 and a cooler 90.

The heater 80 is used as a heating facility in a building BLD.

The cooler 90 is used as a cooling facility in the building BLD.

The geothermal heat utilization system 10 is configured to pump hot water as underground water to be supplied from one of the upper aquifer LY1 and the lower aquifer LY2, and at the same time, to pump cold water as underground water to be supplied from the other of the upper aquifer LY1 and the lower aquifer LY2.

(Configuration of First Well)

The first well 20 is a well that penetrates the upper aquifer LY1 and extends to the lower aquifer LY2 from above ground to underground.

As shown in FIG. 2, the first well 20 includes a first storage unit 21, a first switching unit 22, a first upper opening 23, and a first lower opening 24.

The first well 20 includes a casing 20a embedded in an excavation hole HOL1 obtained by excavating underground from a ground surface SG to the lower aquifer LY2.

In the casing 20a, packings PK are provided between the first storage unit 21, the first switching unit 22, the first upper opening 23, and the first lower opening 24 and prevent the flow of the underground water between them.

The first storage unit 21 is provided above the first upper opening 23.

The first storage unit 21 has a first pump 21a capable of pumping the underground water in the first storage unit 21.

The first switching unit 22 is provided between the first storage unit 21 and the first upper opening 23.

The first switching unit 22 includes a first port 22a that opens to the first storage unit 21 and a second port 22b that is connected to the second pipe 50.

The first switching unit 22 further includes a third port 22c that opens to the first upper opening 23, and a fourth port 22d that passes through the first upper opening 23, extends toward the first lower opening 24, and opens to the first lower opening 24.

The first switching unit 22 is capable of switching between a mode for connecting the first storage unit 21 and the first upper opening 23 and a mode for connecting the first storage unit 21 and the first lower opening 24 by switching internal pipes thereof.

For example, in the case shown in FIG. 2, the first switching unit 22 connects the first storage unit 21 and the first upper opening 23 to each other by connecting the first port 22a and the third port 22c to each other.

Further, in the case shown in FIG. 2, the first switching unit 22 connects the second pipe 50 and the first lower opening 24 to each other by connecting the second port 22b and the fourth port 22d to each other.

The first upper opening 23 opens in the upper aquifer LY1.

The first upper opening 23 is a portion of the first well 20 located at a depth corresponding to the upper aquifer LY1.

The underground water is stored in the first upper opening 23.

For example, the casing 20a is provided with a strainer 23a constituted by a plurality of slits in the upper aquifer LY1. The first upper opening 23 is configured such that the underground water in the upper aquifer LY1 can be taken into the inside of the casing 20a and the underground water can be returned to the upper aquifer LY1 from the inside of the casing 20a via the strainer 23a.

The first lower opening 24 opens in the lower aquifer LY2.

The first lower opening 24 is a portion of the first well 20 located at a depth corresponding to the lower aquifer LY2.

The underground water is stored in the first lower opening 24.

The first upper opening 23 and the first lower opening 24 are arranged vertically.

For example, the casing 20a is provided with a strainer 24a constituted by a plurality of slits in the lower aquifer LY2. The first lower opening 24 is configured such that the underground water in the lower aquifer LY2 can be taken into the inside of the casing 20a and the underground water can be returned to the lower aquifer LY2 from the inside of the casing 20a via the strainer 24a.

(Configuration of Second Well)

The second well 30 is a well that penetrates the upper aquifer LY1 and extends to the lower aquifer LY2 from above ground to underground.

The second well 30 is provided at a predetermined distance from the first well 20.

As shown in FIG. 2, the second well 30 includes a second storage unit 31, a second switching unit 32, a second upper opening 33, and a second lower opening 34.

The second well 30 includes a casing 30a embedded in an excavation hole HOL2 obtained by excavating the underground from a ground surface SG to the lower aquifer LY2.

In the casing 30a, packings PK are provided between the second storage unit 31, the second switching unit 32, the second upper opening 33, and the second lower opening 34 and prevent the flow of the underground water between them.

The second storage unit 31 is provided above the second upper opening 33.

The second storage unit 31 has a second pump 31a capable of pumping the underground water in the second storage unit 31.

The second switching unit 32 is provided between the second storage unit 31 and the second upper opening 33.

The second switching unit 32 includes a first port 32a that opens to the second storage unit 31 and a second port 32b that is connected to the first pipe 40.

The second switching unit 32 further includes a third port 32c that opens to the second upper opening 33, and a fourth port 32d that passes through the second upper opening 33, extends toward the second lower opening 34, and opens to the second lower opening 34.

The second switching unit 32 is capable of switching between a mode for connecting the second storage unit 31 and the second upper opening 33 and a mode for connecting the second storage unit 31 and the second lower opening 34 by switching internal pipes thereof.

For example, in the case shown in FIG. 2, the second switching unit 32 connects the second storage unit 31 and the second lower opening 34 to each other by connecting the first port 32a and the fourth port 32d to each other.

Further, in the case shown in FIG. 2, the second switching unit 32 connects the first pipe 40 and the second upper opening 33 to each other by connecting the second port 32b and the third port 32c to each other.

The second upper opening 33 opens in the upper aquifer LY1.

The second upper opening 33 is a portion of the second well 30 located at a depth corresponding to the upper aquifer LY1.

The underground water is stored in the second upper opening 33.

For example, the casing 30a is provided with a strainer 33a constituted by a plurality of slits in the upper aquifer LY1. The second upper opening 33 is configured such that the underground water in the upper aquifer LY1 can be taken into the inside of the casing 30a and the underground water can be returned to the upper aquifer LY1 from the inside of the casing 30a via the strainer 33a.

The second lower opening 34 opens in the lower aquifer LY2.

The second lower opening 34 is a portion of the second well 30 located at a depth corresponding to the lower aquifer LY2.

The underground water is stored in the second lower opening 34.

The second upper opening 33 and the second lower opening 34 are arranged vertically.

For example, the casing 30a is provided with a strainer 34a constituted by a plurality of slits in the lower aquifer LY2. The second lower opening 34 is configured such that the underground water in the lower aquifer LY2 can be taken into the inside of the casing 30a and the underground water can be returned to the lower aquifer LY2 from the inside of the casing 30a via the strainer 34a.

Further, the geothermal heat utilization system 10 operates the first pump 21a and the second pump 31a at the same time. Therefore, the geothermal heat utilization system 10 pumps the underground water from one of the upper aquifer LY1 and the lower aquifer LY2, and at the same time, pumps the underground water from the other of the upper aquifer LY1 and the lower aquifer LY2.

(Configuration of First Pipe)

The first pipe 40 extends from a first end 40a to a second end 40b via a primary side (a primary side pipe 60a) of the first heat exchanger 60.

The first end 40a of the first pipe 40 is connected to the first pump 21a such that water can be pumped from the first pump 21a to the first pipe 40.

The first end 40a of the first pipe 40 extends into the first well 20 toward the first pump 21a.

The second end 40b of the first pipe 40 is connected to the second port 32b of the second switching unit 32 via an opening and closing valve, a check valve, or the like such that the water can be supplied toward the second port 32b of the second switching unit 32.

The second end 40b of the first pipe 40 extends into the second well 30 toward the second port 32b of the second switching unit 32.

(Configuration of Second Pipe)

The second pipe 50 extends from a first end 50a to a second end 50b via a primary side (a primary side pipe 70a) of the second heat exchanger 70.

The first end 50a of the second pipe 50 is connected to the second pump 31a such that water can be pumped from the second pump 31a to the second pipe 50.

The first end 50a of the second pipe 50 extends into the second well 30 toward the second pump 31a.

The second end 50b of the second pipe 50 is connected to the second port 22b of the first switching unit 22 via an opening and closing valve, a check valve, or the like such that the water can be supplied toward the second port 22b of the first switching unit 22.

The second end 50b of the second pipe 50 extends into the first well 20 toward the second port 22b of the first switching unit 22.

(Configuration of First Heat Exchanger)

The primary side (the primary side pipe 60a) of the first heat exchanger 60 is connected in the middle of the first pipe 40.

A secondary side (a secondary side pipe 60b) of the first heat exchanger 60 is connected to the heater 80.

The first heat exchanger 60 can exchange heat between the primary side and the secondary side.

The geothermal heat utilization system 10 circulates a heat medium between the secondary side of the first heat exchanger 60 and the heater 80.

(Configuration of Second Heat Exchanger)

The primary side (the primary side pipe 70a) of the second heat exchanger 70 is connected in the middle of the second pipe 50.

A secondary side (a secondary side pipe 70b) of the second heat exchanger 70 is connected to the cooler 90.

The second heat exchanger 70 can exchange heat between the primary side and the secondary side.

The geothermal heat utilization system 10 circulates a heat medium between the secondary side of the second heat exchanger 70 and the cooler 90.

(Operation)

An operation of the geothermal heat utilization system 10 of the present embodiment will be described.

First, the case shown in FIG. 2 (a first mode) will be described.

In the case shown in FIG. 2, as described above, the first switching unit 22 connects the first storage unit 21 and the first upper opening 23 to each other. Accordingly, the underground water taken in at the first upper opening 23 is pumped to the first pipe 40.

For example, as an initial state, hot water is stored in the upper aquifer LY1 around the first upper opening 23.

In this case, at least at the start of the first mode, the hot water taken in at the first upper opening 23 is pumped to the first pipe 40.

In the case shown in FIG. 2, as described above, the second switching unit 32 connects the second storage unit 31 and the second lower opening 34 to each other. Accordingly, the underground water taken in at the second lower opening 34 is pumped to the second pipe 50.

For example, as an initial state, cold water is stored in the upper aquifer LY1 around the second lower opening 34.

In this case, at least at the start of the first mode, the cold water taken in at the second lower opening 34 is pumped to the second pipe 50.

By the above operation, the geothermal heat utilization system 10 can supply the underground water of the upper aquifer LY1 from the first upper opening 23 to the second upper opening 33 via the first pipe 40.

Further, the geothermal heat utilization system 10 can supply the underground water of the lower aquifer LY2 from the second lower opening 34 to the first lower opening 24 via the second pipe 50.

Therefore, the geothermal heat utilization system 10 can supply storage hot heat of the upper aquifer LY1 to the first heat exchanger 60 and can supply storage cold heat of the underground water of the lower aquifer LY2 to the second heat exchanger 70.

Further, the geothermal heat utilization system 10 can store cold heat obtained from the first heat exchanger 60 in the upper aquifer LY1 and can store hot heat obtained from the second heat exchanger 70 in the lower aquifer LY2.

For example, in the case of the present embodiment, the geothermal heat utilization system 10 consumes the hot water acquired from the upper aquifer LY1 by supplying the hot water to the first heat exchanger 60 via the first upper opening 23. On the other hand, the geothermal heat utilization system 10 stores cold water acquired in the first heat exchanger 60 by supplying the cold water to the upper aquifer LY1 via the second upper opening 33.

Further, in the case of the present embodiment, the geothermal heat utilization system 10 consumes the hot water acquired from the lower aquifer LY2 by supplying the hot water to the second heat exchanger 70 via the second lower opening 34. On the other hand, the geothermal heat utilization system 10 stores cold water acquired in the second heat exchanger 70 by supplying the cold water to the lower aquifer LY2 via the first lower opening 24.

Further, the geothermal heat utilization system 10 pumps the hot water from one of the upper aquifer LY1 and the lower aquifer LY2, and at the same time, pumps the cold water from the other of the upper aquifer LY1 and the lower aquifer LY2 by operating the first pump 21*a* and the second pump 31*a* at the same time.

In the case of the first mode of the present embodiment, the geothermal heat utilization system 10 pumps the hot water from the upper aquifer LY1, and at the same time, pumps the cold water from the lower aquifer LY2 by operating the first pump 21*a* and the second pump 31*a* at the same time.

Here, "hot water" refers to water having a temperature higher than the initial underground temperature of the underground water in each aquifer, and "cold water" refers to water having a temperature lower than the initial underground temperature of the underground water in each aquifer.

For example, the initial underground temperature of the underground water in each aquifer is 18° C.

Next, the case shown in FIG. 3 (a second mode) will be described.

FIG. 3 shows a state in which the internal pipes of the first switching unit 22 and the second switching unit 32 are switched from the connection shown by a solid line in FIG. 2 to the connection shown by a dotted line in FIG. 2.

In this case, the first switching unit 22 connects the second pipe 50 and the first upper opening 23 to each other by connecting the second port 22*b* and the third port 22*c* to each other.

Further, the first switching unit 22 connects the first storage unit 21 and the first lower opening 24 to each other by connecting the first port 22*a* and the fourth port 22*d* to each other.

Further, the second switching unit 32 connects the second storage unit 31 and the second upper opening 33 to each other by connecting the first port 32*a* and the third port 32*c* to each other.

Further, the second switching unit 32 connects the first pipe 40 and the second lower opening 34 to each other by connecting the second port 32*b* and the fourth port 32*d* to each other.

Accordingly, the underground water taken in at the first lower opening 24 is pumped to the first pipe 40, and the underground water taken in at the second upper opening 33 is pumped to the second pipe 50.

For example, the second mode may be started after the first mode is performed.

In this case, at least at the start of the second mode, cold water is stored in the upper aquifer LY1 around the second upper opening 33.

Therefore, the cold water taken in at the second upper opening 33 is pumped to the second pipe 50.

Further, in this case, at least at the start of the second mode, hot water is stored in the lower aquifer LY2 around the first lower opening 24.

Therefore, the hot water taken in at the first lower opening 24 is pumped to the first pipe 40.

By the above operation, the geothermal heat utilization system 10 can supply the underground water of the lower aquifer LY2 from the first lower opening 24 to the second lower opening 34 via the first pipe 40.

Further, the geothermal heat utilization system 10 can supply the underground water of the upper aquifer LY1 from the second upper opening 33 to the first upper opening 23 via the second pipe 50.

Therefore, the geothermal heat utilization system 10 can supply storage hot heat of the lower aquifer LY2 to the first heat exchanger 60 and can supply storage cold heat of the upper aquifer LY1 to the second heat exchanger 70.

Further, the geothermal heat utilization system 10 can store cold heat obtained from the first heat exchanger 60 in the lower aquifer LY2 and can store hot heat obtained from the second heat exchanger 70 in the upper aquifer LY1.

For example, in the case of the second mode of the present embodiment, the geothermal heat utilization system 10 consumes the cold water acquired from the upper aquifer LY1 by supplying the cold water to the second heat exchanger 70 via the second upper opening 33. On the other hand, the geothermal heat utilization system 10 stores hot water acquired in the second heat exchanger 70 by supplying the hot water to the upper aquifer LY1 via the first upper opening 23.

Further, in the case of the present embodiment, the geothermal heat utilization system 10 consumes the hot water acquired from the lower aquifer LY2 by supplying the hot water to the first heat exchanger 60 via the first lower opening 24. On the other hand, the geothermal heat utilization system 10 stores cold water acquired in the first heat exchanger 60 by supplying the cold water to the lower aquifer LY2 via the second lower opening 34.

(Operational Effects)

The geothermal heat utilization system 10 of the present embodiment can supply the underground water of the upper aquifer LY1 and the underground water of the lower aquifer LY2 separately, and thus can prevent the underground water of the upper aquifer LY1 and the underground water of the lower aquifer LY2 from being mixed with each other.

Thus, in the geothermal heat utilization system 10 of the present embodiment, blockage of the well is prevented when the upper aquifer LY1 and the lower aquifer LY2 are used.

For example, in a case in which the underground water of the upper aquifer LY1 is rich in oxygen and the underground water of the lower aquifer LY2 is rich in iron, when the underground water of the upper aquifer LY1 and the underground water of the lower aquifer LY2 are mixed with each other, iron oxide is produced and the strainer of the opening of each well is blocked.

On the other hand, the geothermal heat utilization system 10 of the present embodiment has a structure in which the underground water of the upper aquifer and the underground water of the lower aquifer are unlikely to be mixed with each other, and thus can suppress the blockage of the well when the upper aquifer LY1 and the lower aquifer LY2 are used.

Further, the geothermal heat utilization system 10 of the present embodiment pumps hot water as underground water to be supplied from one of the upper aquifer LY1 and the lower aquifer, and at the same time, pumps cold water as underground water to be supplied from the other of the upper aquifer and the lower aquifer.

Therefore, the hot water and the cold water can be used at the same time.

For example, in a building BLD, one room can be heated, and at the same time, another room can be cooled.

Further, the geothermal heat utilization system 10 of the present embodiment can reversely supply the heat stored by water supplying in each aquifer of the upper aquifer LY1 and the lower aquifer LY2. Therefore, the heat stored by water supplying can be used.

Further, in the geothermal heat utilization system 10 of the present embodiment, the first pump 21a can pump the underground water of the upper aquifer LY1 in the first mode and can pump the underground water of the lower aquifer LY2 in the second mode. Similarly, in the geothermal heat utilization system 10 of the present embodiment, the second pump 31a can pump the underground water of the upper aquifer LY1 in the second mode and can pump the underground water of the lower aquifer LY2 in the first mode. Therefore, each pump can be used depending on the mode, and the utilization efficiency of each pump can be improved.

Further, in the geothermal heat utilization system 10 of the present embodiment, it is possible to pump and circulate the underground water of the upper aquifer LY1 and it is possible to pump and circulate the underground water of the lower aquifer LY2.

Therefore, a heat storage capacity can be doubled as compared with the geothermal heat utilization system in which the underground water of one aquifer is pumped and returned.

Further, in the geothermal heat utilization system 10 of the present embodiment, the first upper opening 23 and the first lower opening 24 are arranged vertically, and the second upper opening 33 and the second lower opening 34 are arranged vertically, and thus a site area can be effectively used.

Particularly, in urban areas where high-rise buildings with high heat demand are concentrated, it is necessary to equip a large-capacity heat source system, but the site area is limited, and thus the geothermal heat utilization system 10 of the present embodiment is effective.

For example, according to the geothermal heat utilization system 10 of the present embodiment, it is possible to utilize the storage heat of the aquifer by using the heat utilization potential of the underground water widely existing in the alluvial plain common to metropolitan areas.

Further, in the geothermal heat utilization system 10 of the present embodiment, the underground water of the upper aquifer LY1 is supplied from the first upper opening 23 toward the second upper opening 33 while the underground water of the lower aquifer LY2 is supplied from the second lower opening 34 toward the first lower opening 24.

That is, in each well, the water is pumped from one aquifer while the water is circulated to the other aquifer.

Therefore, the geothermal heat utilization system 10 of the present embodiment can prevent ground subsidence and ground rise.

<Example of Switching Unit>

Examples of the first switching unit 22 in the embodiment of the heat utilization system described above are shown in FIGS. 4 to 19. Hereinafter, each example of the first switching unit 22 will be described, but the second switching unit 32 can also have the same configuration.

For example, the first switching unit 22 may include a revolver 22R as shown in FIGS. 4 to 7.

Figure 4:
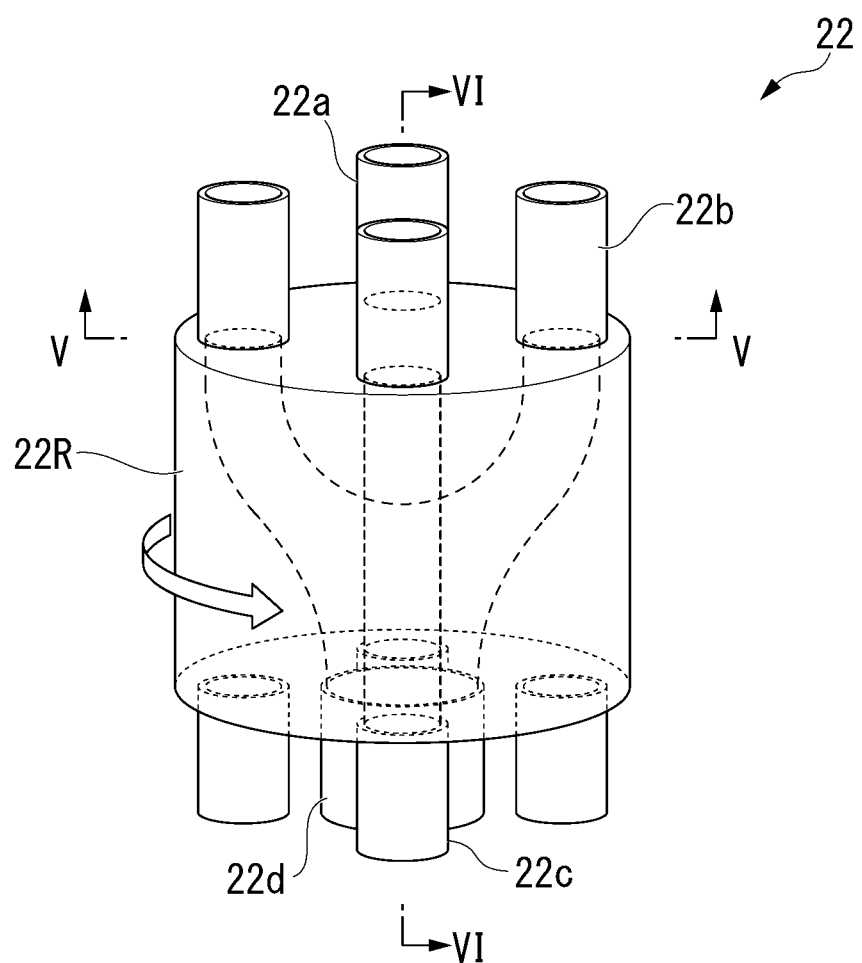
FIG. 4 is a perspective view of an example of a switching unit according to the first embodiment.
Figure 5:
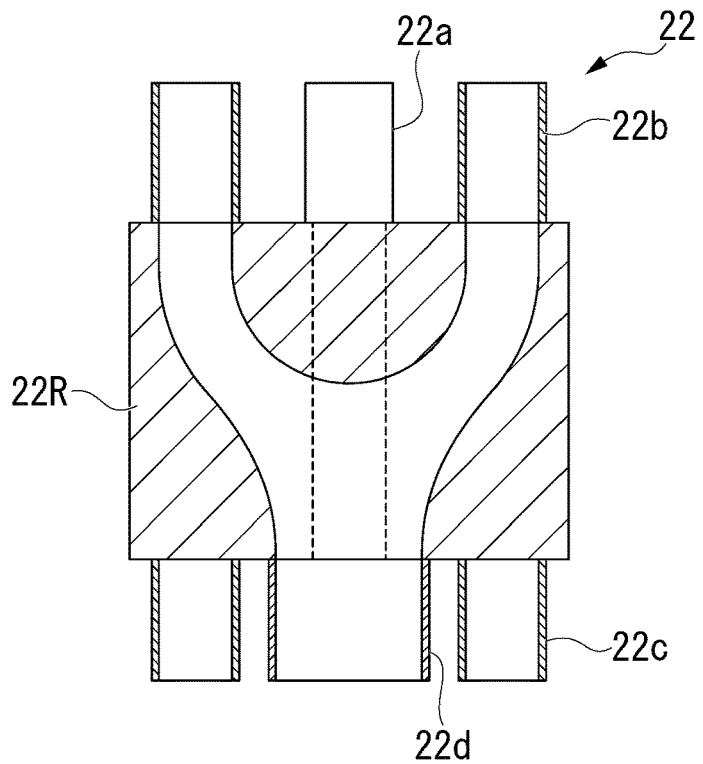
FIG. 5 is a cross-sectional view along line V-V of FIG. 4.
Figure 6:
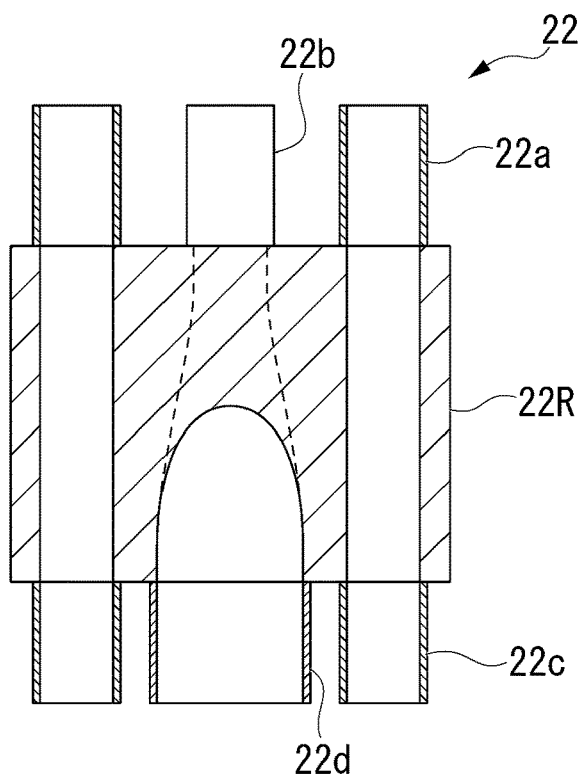
FIG. 6 is a cross-sectional view along line VI-VI of FIG. 4.
Figure 7:
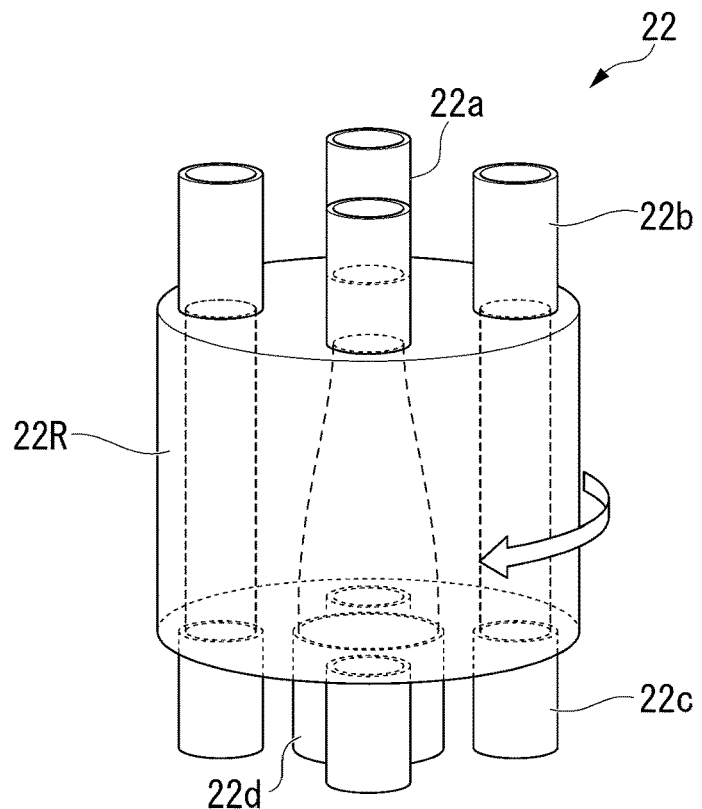
FIG. 7 is a perspective view of an example of a switching unit according to the first embodiment.

When the revolver 22R is rotated from the state shown in FIG. 4 to the state shown in FIG. 7 by 90°, the first switching unit 22 can change a flow path.

For example, the first switching unit 22 may include a plurality of three-way valves 22T as shown in FIGS. 8 to 11.

When the three-way valves 22T are switched, the first switching unit 22 can change a flow path.

Figure 8:
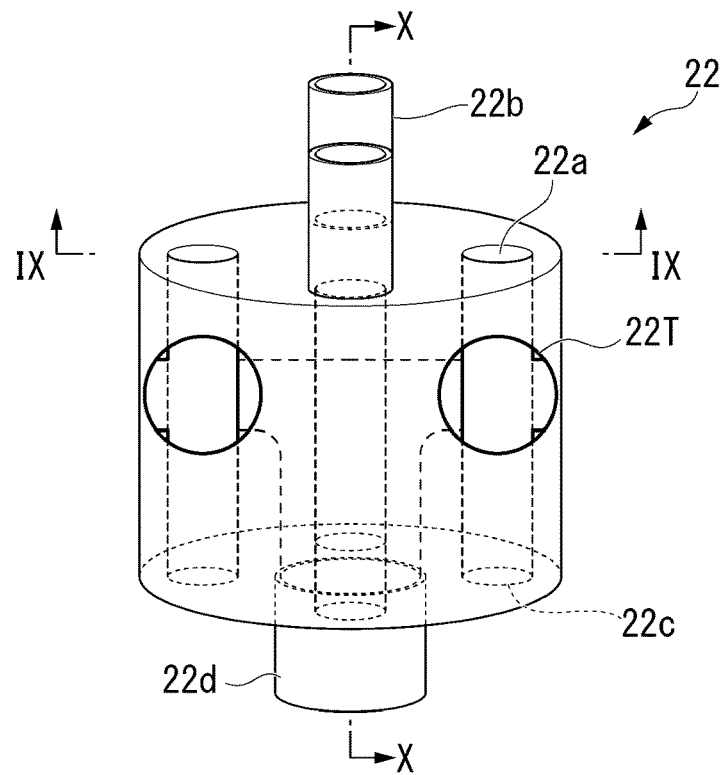
FIG. 8 is a perspective view of an example of a switching unit according to the first embodiment.
Figure 9:
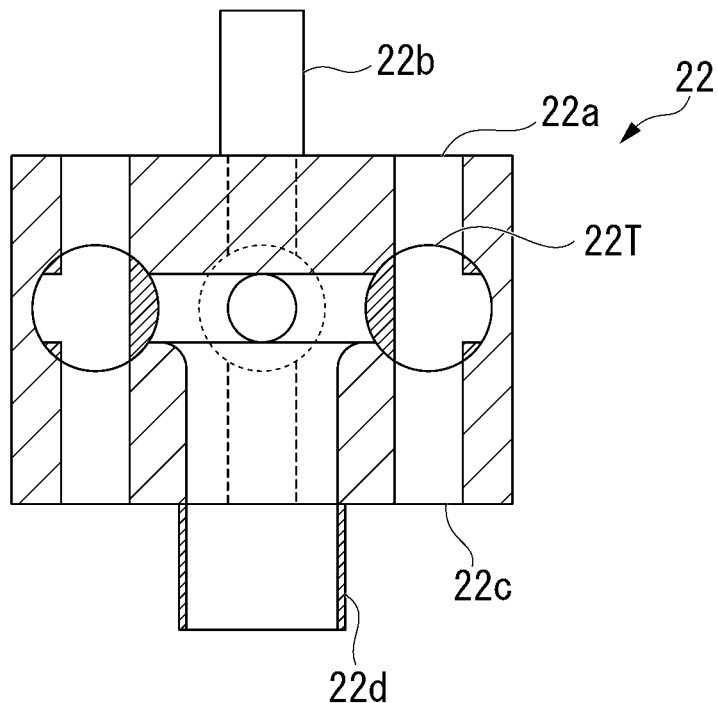
FIG. 9 is a cross-sectional view along line IX-IX of FIG. 8.
Figure 10:
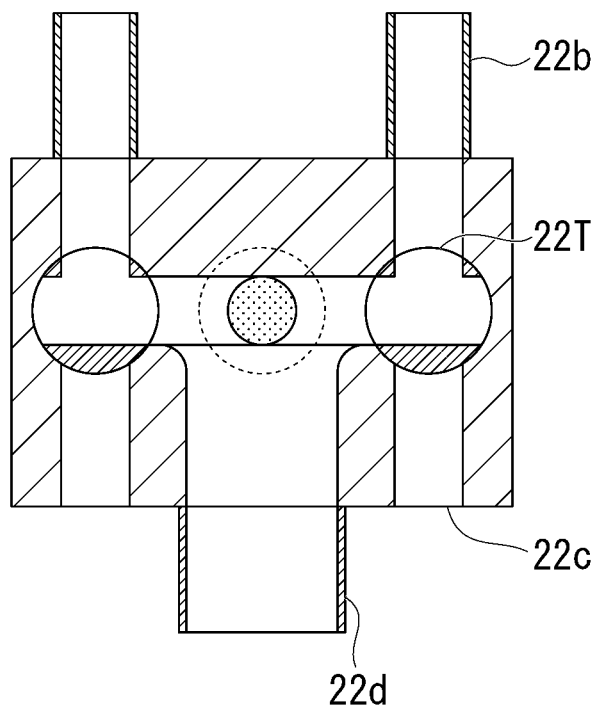
FIG. 10 is a cross-sectional view along line X-X of FIG. 8.
Figure 11:
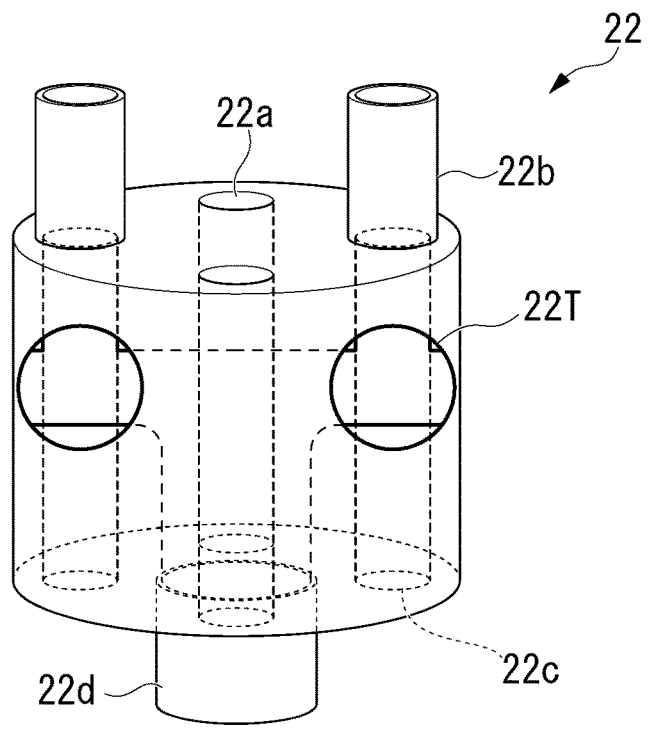
FIG. 11 is a perspective view of an example of a switching unit according to the first embodiment.

FIG. 8 is a perspective view of the first switching unit 22 when seen from the front, and FIG. 11 is a perspective view of the first switching unit 22 when seen from the side.

The three-way valve 22T may be, for example, a ball valve.

Figure 12:
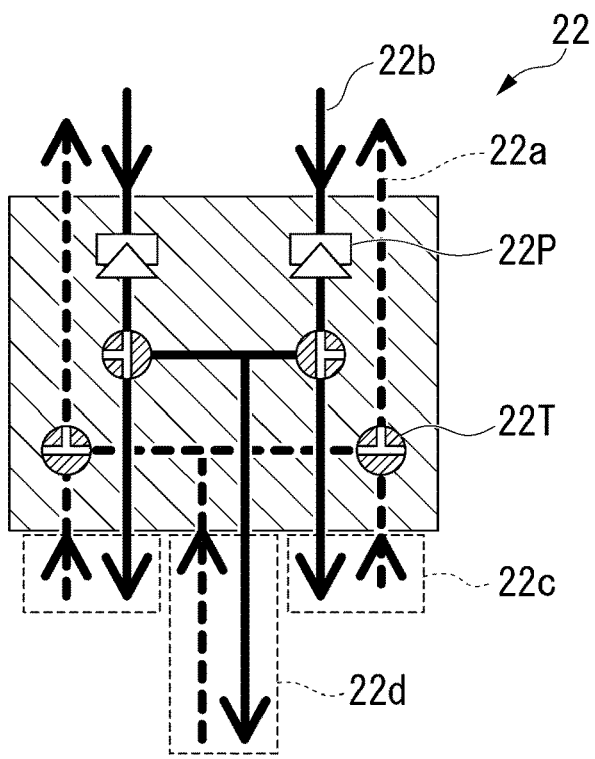
FIG. 12 is a system diagram of an example of a switching unit according to the first embodiment.

For example, the first switching unit 22 may include a plurality of three-way valves 22T and a plurality of water injection valves 22P as shown in FIG. 12.

When the three-way valves 22T and the water injection valves 22P are switched, the first switching unit 22 can change a flow path.

Figure 13:
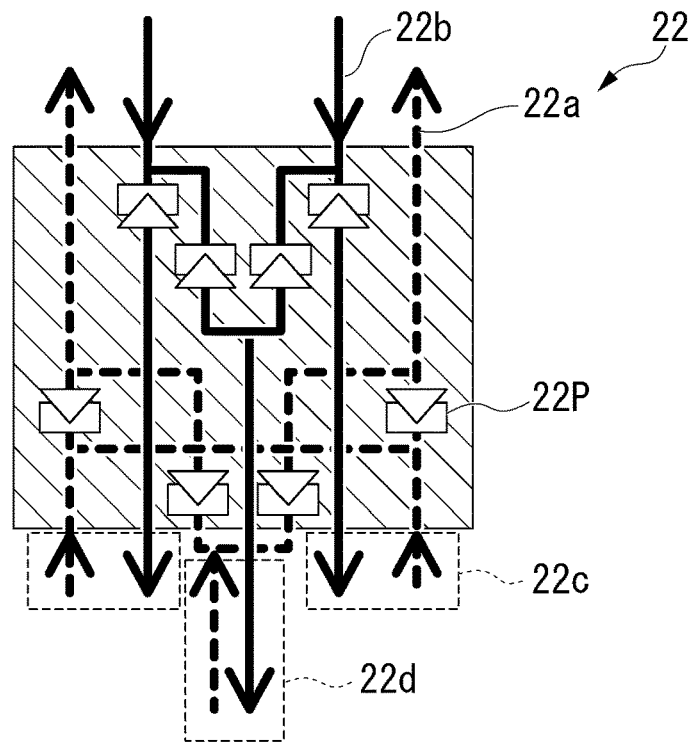
FIG. 13 is a system diagram of an example of a switching unit according to the first embodiment.
Figure 14:
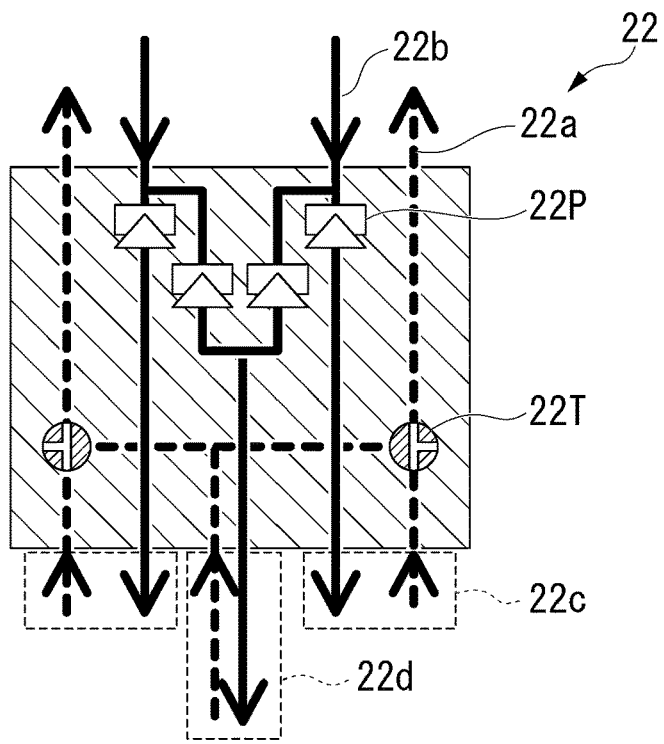
FIG. 14 is a system diagram of an example of a switching unit according to the first embodiment.

As another example, the first switching unit 22 may be a combination of a plurality of water injection valves 22P as shown in FIG. 13 or a combination of a plurality of three-way valves 22T and a plurality of water injection valves 22P as shown in FIG. 14.

Figure 15:
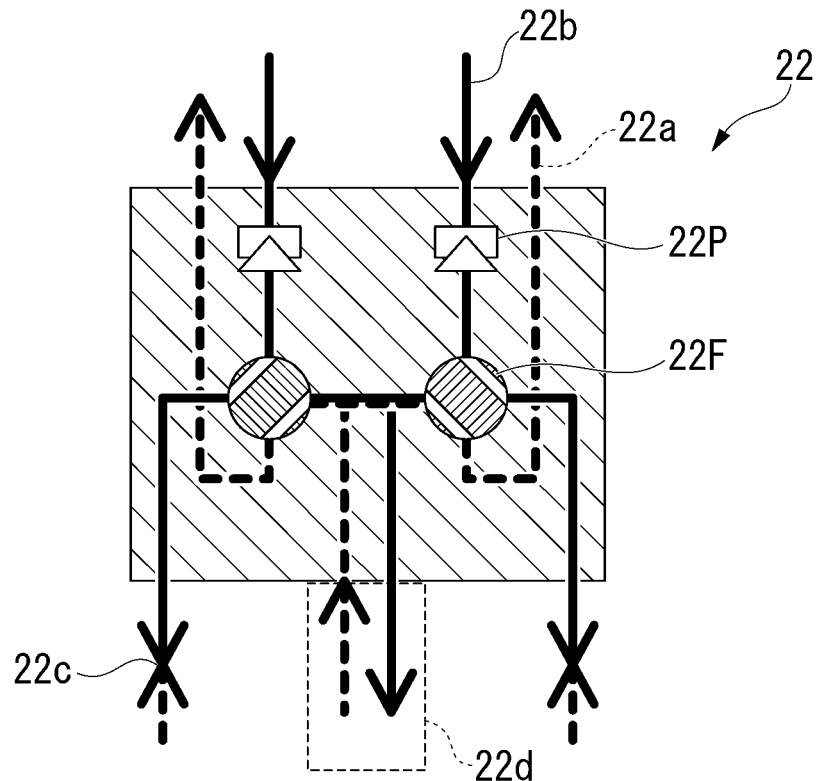
FIG. 15 is a system diagram of an example of a switching unit according to the first embodiment.

For example, the first switching unit 22 may include a plurality of four-way valves 22F and a plurality of water injection valves 22P as shown in FIG. 15.

When the four-way valves 22F and the water injection valves 22P are switched, the first switching unit 22 can change a flow path.

Figure 16:
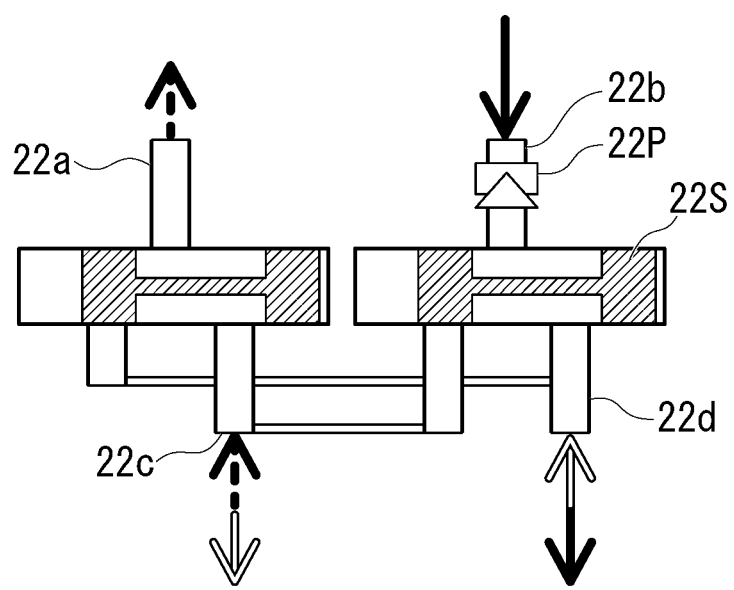
FIG. 16 is a partial cross-sectional view of an example of a switching unit according to the first embodiment.
Figure 17:
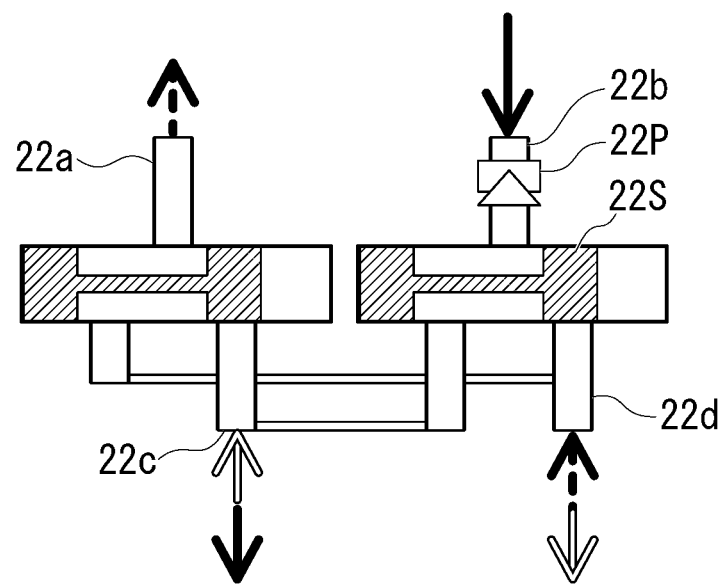
FIG. 17 is a partial cross-sectional view of an example of a switching unit according to the first embodiment.

For example, the first switching unit 22 may include two slide mechanisms 22S as shown in FIGS. 16 and 17.

When the slide mechanisms 22S are switched from the state shown in FIG. 16 to the state shown in FIG. 17, the first switching unit 22 can change a flow path.

The first switching unit 22 may further include a water injection valve 22P.

Figure 18:
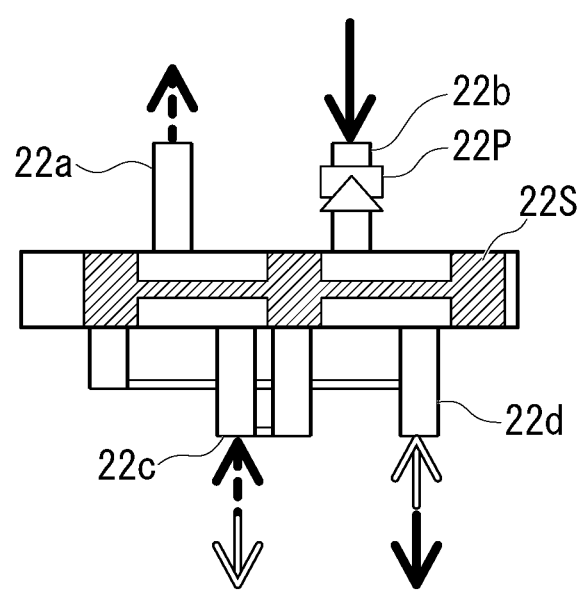
FIG. 18 is a partial cross-sectional view of an example of a switching unit according to the first embodiment.
Figure 19:
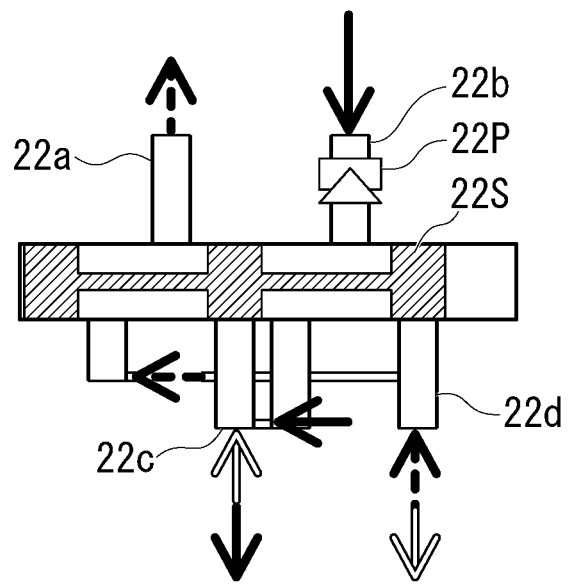
FIG. 19 is a partial cross-sectional view of an example of a switching unit according to the first embodiment.

As another example, as shown in FIGS. 18 and 19, the first switching unit 22 may have a configuration in which two slide mechanisms 22S are integrated. In this case, when the integrated slide mechanism 22S is switched from the state shown in FIG. 18 to the state shown in FIG. 19, the first switching unit 22 can change a flow path.

<Embodiment of Operation Method for Geothermal Heat Utilization System>

An embodiment of an operation method for a geothermal heat utilization system will be described with reference to FIG. 20.

The present operation method is executed using the geothermal heat utilization system 10 of the above-described embodiment.

Figure 20:
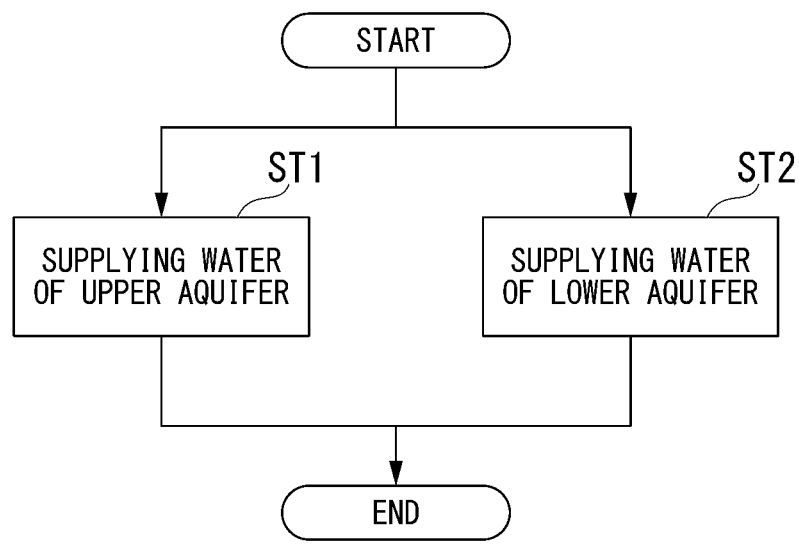
FIG. 20 is a flowchart of an operation method for a geothermal heat utilization system according to the first embodiment.

First, as shown in FIG. 20, the underground water of the upper aquifer LY1 is supplied from the first upper opening 23 to the second upper opening 33 via the first pipe 40 (ST1: a step of supplying the underground water of the upper aquifer).

At the same time as the execution of ST1, the underground water of the lower aquifer LY2 is supplied from the second lower opening 34 to the first lower opening 24 via the second pipe 50 (ST2: a step of supplying the underground water of the lower aquifer).

Further, in the operation method of the geothermal heat utilization system 10, hot water as underground water to be supplied from one of the upper aquifer LY1 and the lower aquifer LY2 is pumped, and at the same time, cold water as underground water to be supplied from the other of the upper aquifer LY1 and the lower aquifer LY2 is pumped.

Second Embodiment

A second embodiment of a geothermal heat utilization system will be described with reference to FIGS. 21 to 23.

Figure 21:
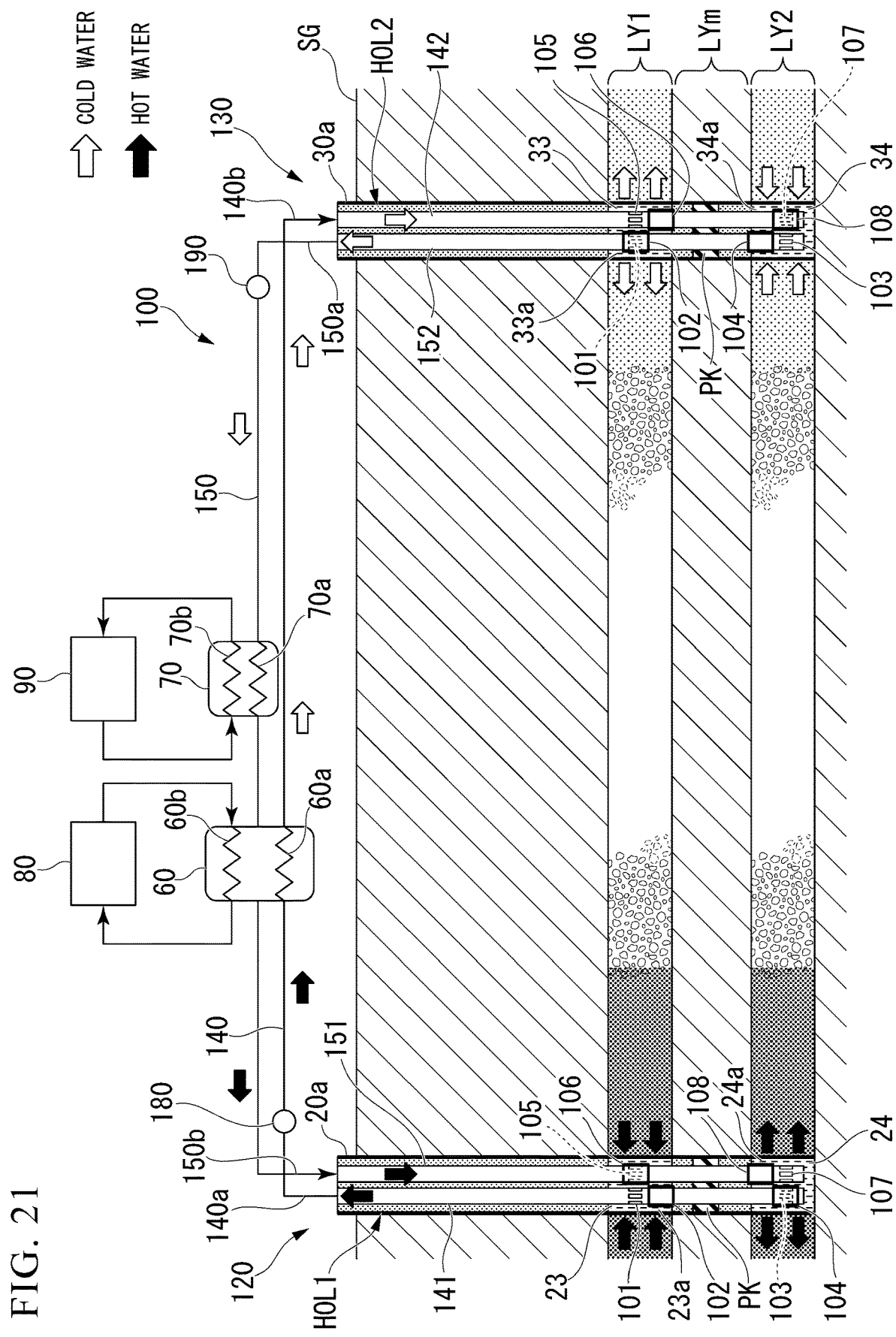
FIG. 21 is a system diagram of a geothermal heat utilization system according to a second embodiment.
Figure 22:
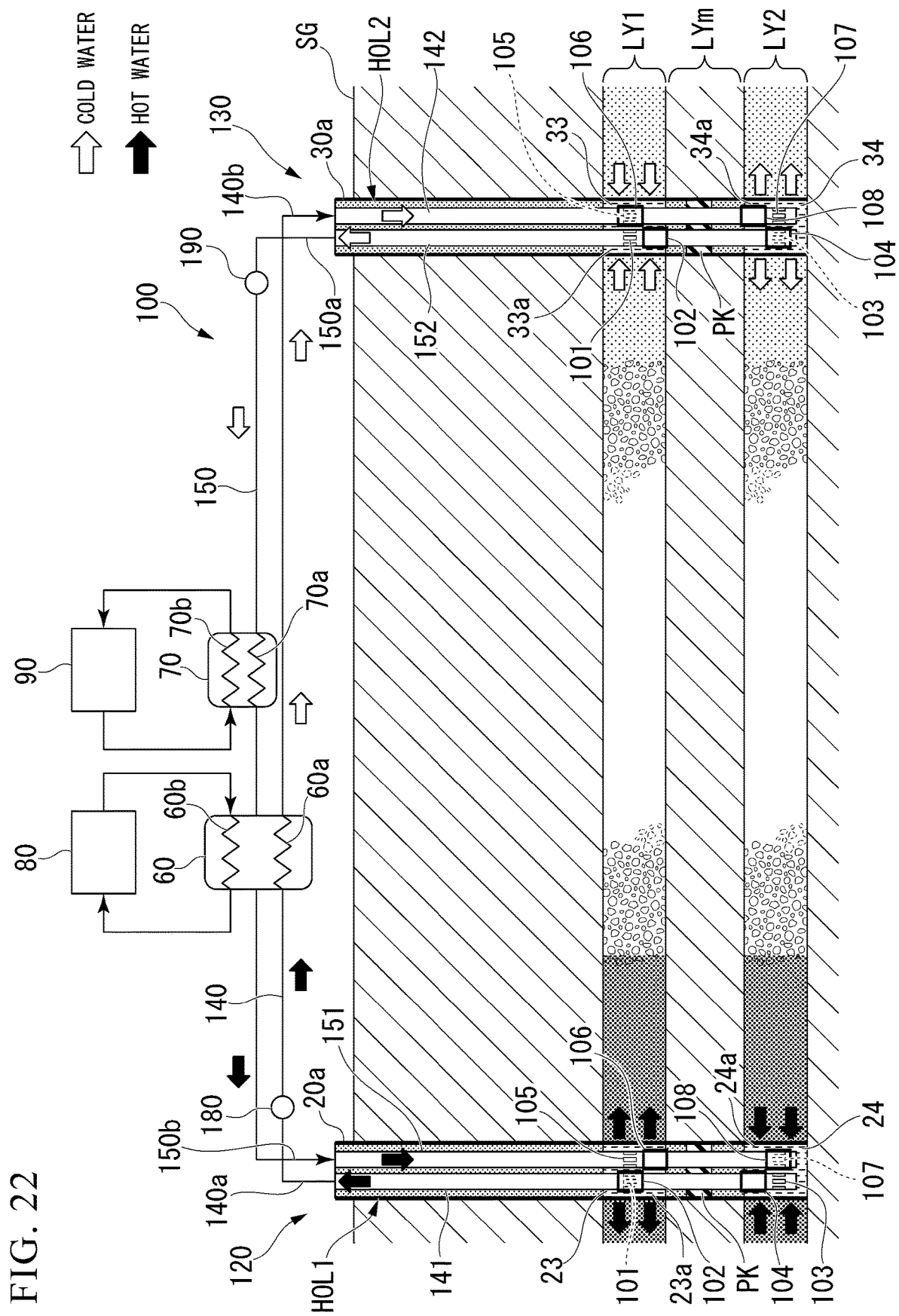
FIG. 22 is a system diagram of the geothermal heat utilization system according to the second embodiment.

In FIGS. 21 and 22, the arrows indicate the flow of a heat medium (including underground water) in each portion.

White arrows indicate cold water, and black arrows indicate hot water.

A geothermal heat utilization system 100 of the second embodiment is configured in the same manner and has the same function as the geothermal heat utilization system 10 of the first embodiment except that the configurations of the first well, the second well, the first pipe, and the second pipe are different, and thus duplicate explanation will be omitted.
(Configuration of Geothermal Heat Utilization System)

As shown in FIGS. 21 and 22, the geothermal heat utilization system 100 includes a first well 120 and a second well 130.

The geothermal heat utilization system 100 further includes a first pipe 140, a second pipe 150, a first heat exchanger 60, and a second heat exchanger 70.

The geothermal heat utilization system 100 further includes a heater 80 and a cooler 90.

For example, the geothermal heat utilization system 100 may further include a first pump 180 and a second pump 190.

The first pump 180 is provided in the middle of the first pipe 140 to supply water from the first well 120 to the first heat exchanger 60.

For example, the first pump 180 may be provided directly above the first well 120.

The second pump 190 is provided in the middle of the first pipe 140 to supply water from the second well 130 to the second heat exchanger 70.

For example, the second pump 190 may be provided directly above the second well 130.

Further, the geothermal heat utilization system 100 operates the first pump 180 and the second pump 190 at the same time. Therefore, the geothermal heat utilization system 100 pumps the underground water from one of the upper aquifer LY1 and the lower aquifer LY2, and at the same time, pumps the underground water from the other of the upper aquifer LY1 and the lower aquifer LY2.
(Configuration of First Well)

The first well 120 is a well that penetrates the upper aquifer LY1 and extends to the lower aquifer LY2 from above ground to underground.

The first well 120 includes a first upper opening 23 and a first lower opening 24.

The first well 120 includes a casing 20a embedded in an excavation hole HOL1 obtained by excavating underground from a ground surface SG to the lower aquifer LY2.

In the casing 20a, a packing PK is provided between the first upper opening 23 and the first lower opening 24 and prevents the flow of the underground water between them.
(Configuration of Second Well)

The second well 130 is a well that penetrates the upper aquifer LY1 and extends to the lower aquifer LY2 from above ground to underground.

The second well 130 is provided at a predetermined distance from the first well 120.

The second well 130 includes a second upper opening 33 and a second lower opening 34.

The second well 130 includes a casing 30a embedded in an excavation hole HOL2 obtained by excavating the underground from a ground surface SG to the lower aquifer LY2.

In the casing 30a, a packing PK is provided between the second upper opening 33 and the second lower opening 34 and prevents the flow of the underground water between them.
(Configuration of First Pipe)

The first pipe 140 extends from a first end 140a to a second end 140b via a primary side (a primary side pipe 60a) of the first heat exchanger 60.

The first pipe 140 includes a first pumping pipe 141 extending into the first well 120 at the first end 140a.

For example, the first pumping pipe 141 may penetrate the first upper opening 23 and extend into the first lower opening 24.

The first pipe 140 further includes a second water injection pipe 142 extending into the second well 130 at the second end 140b.

For example, the second water injection pipe 142 may penetrate the second upper opening 33 and extend into the second lower opening 34.
(Configuration of Second Pipe)

The second pipe 150 extends from a first end 150a to a second end 150b via a primary side (a primary side pipe 70a) of the second heat exchanger 70.

The second pipe 150 includes a second pumping pipe 152 extending into the second well 130 at the first end 150a.

For example, the second pumping pipe 152 may penetrate the second upper opening 33 and extend into the second lower opening 34.

The second pipe 150 further includes a first water injection pipe 151 extending into the first well 120 at the second end 150b.

For example, the first water injection pipe 151 may penetrate the first upper opening 23 and extend into the first lower opening 24.
(Configuration of Pumping Pipe)

Figure 23:
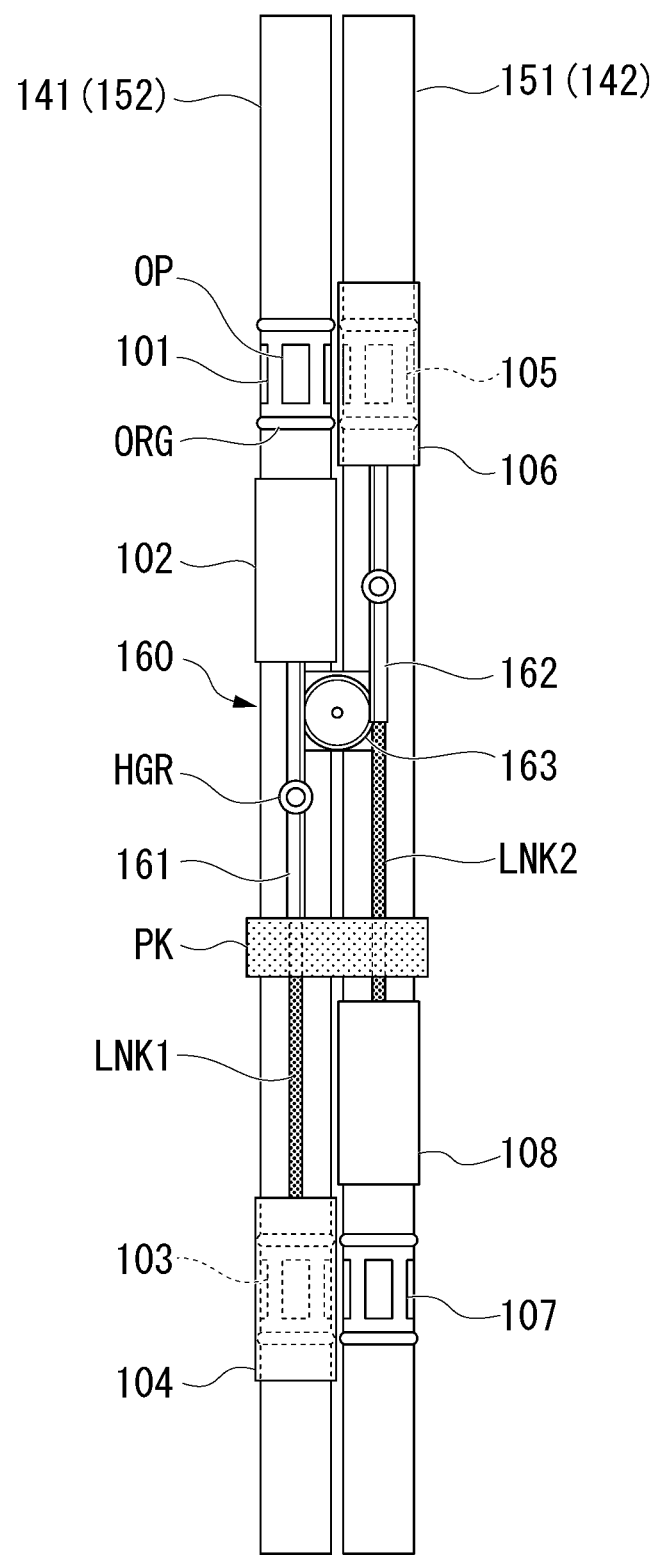
FIG. 23 is a front view of a configuration in each well of the geothermal heat utilization system according to the second embodiment.

As shown in FIG. 23, each pumping pipe of the first pumping pipe 141 and the second pumping pipe 152 has an upper pumping port 101 and a lower pumping port 103.

Each pumping pipe of the first pumping pipe 141 and the second pumping pipe 152 includes a first opening and closing cylinder 102 and a second opening and closing cylinder 104.

For example, each pumping pipe of the first pumping pipe 141 and the second pumping pipe 152 may be closed below the lower pumping port 103.

Hereinafter, the first pumping pipe 141 will be described, but the second pumping pipe 152 has the same configuration as the first pumping pipe 141.

The upper pumping port 101 opens such that water can be pumped from the upper aquifer LY1.

That is, the upper pumping port 101 opens such that the underground water taken into the first upper opening 23 can be pumped from the upper aquifer LY1.

For example, the first pumping pipe 141 may have a plurality of openings OP arranged along a circumference of the pipe as the upper pumping port 101.

The upper pumping port 101 may be provided at any depth position as long as it is above the packing PK.

For example, the upper pumping port 101 may be provided at a depth position corresponding to the upper aquifer LY1.

Further, the upper pumping port 101 may be provided within a range in which the first upper opening 23 is provided in the depth position.

The first opening and closing cylinder 102 can open and close the upper pumping port 101.

For example, the first opening and closing cylinder 102 may be provided on an outer circumference of the first pumping pipe 141 coaxially with the first pumping pipe 141.

Further, the first opening and closing cylinder 102 is configured to hermetically close the upper pumping port 101 via a pair of O-rings ORG provided on the circumference of the first pumping pipe 141 above and below the upper pumping port 101 by sliding to a position aligned with the upper pumping port 101 at which the first opening and closing cylinder 102 covers the openings OP of the upper pumping port 101.

The first opening and closing cylinder 102 is vertically slidable.

For example, the first opening and closing cylinder 102 may be vertically slidable between a position aligned with the upper pumping port 101 and a position below the upper pumping port 101.

Accordingly, the first opening and closing cylinder 102 closes the upper pumping port 101 when it is located at the position aligned with the upper pumping port 101 and opens the upper pumping port 101 when it is located at the position below the upper pumping port 101.

The lower pumping port 103 opens such that water can be pumped from the lower aquifer LY2.

That is, the lower pumping port 103 opens such that the underground water taken into the first lower opening 24 can be pumped from the lower aquifer LY2.

For example, the first pumping pipe 141 may have a plurality of openings OP arranged along the circumference of the pipe as the lower pumping port 103.

The lower pumping port 103 may be provided at any depth position as long as it is below the packing PK.

For example, the lower pumping port 103 may be provided at a depth position corresponding to the lower aquifer LY2.

Further, the lower pumping port 103 may be provided within a range in which the first lower opening 24 is provided in the depth position.

The second opening and closing cylinder 104 can open and close the lower pumping port 103.

For example, the second opening and closing cylinder 104 may be provided on the outer circumference of the first pumping pipe 141 coaxially with the first pumping pipe 141.

Further, the second opening and closing cylinder 104 is configured to hermetically close the lower pumping port 103 via a pair of O-rings ORG provided on the circumference of the first pumping pipe 141 above and below the lower pumping port 103 by sliding to a position aligned with the lower pumping port 103 at which the second opening and closing cylinder 104 covers the openings OP of the lower pumping port 103.

The second opening and closing cylinder 104 is vertically slidable.

For example, the second opening and closing cylinder 104 may be vertically slidable between a position aligned with the lower pumping port 103 and a position above the lower pumping port 103.

Accordingly, the second opening and closing cylinder 104 closes the lower pumping port 103 when it is located at the position aligned with the lower pumping port 103 and opens the lower pumping port 103 when it is located at the position above the lower pumping port 103.

The first opening and closing cylinder 102 and the second opening and closing cylinder 104 are connected to each other via a link LNK1 that extends vertically on the outer circumference of the first pumping pipe 141.

For example, the link LNK1 may be a metal rod extending vertically.

For example, the link LNK1 may extend vertically through the packing PK while the prevention of the flow of the underground water by the packing PK is maintained.

Therefore, the first opening and closing cylinder 102 and the second opening and closing cylinder 104 slide in an interlocking manner in a vertical direction.

For example, the first opening and closing cylinder 102 and the second opening and closing cylinder 104 may be connected to each other such that, when the first opening and closing cylinder 102 is located at the position below the upper pumping port 101, the second opening and closing cylinder 104 is located at the position aligned with the lower pumping port 103.

Accordingly, when the first opening and closing cylinder 102 opens the upper pumping port 101, the second opening and closing cylinder 104 can close the lower pumping port 103.

For example, the first opening and closing cylinder 102 and the second opening and closing cylinder 104 may be connected to each other such that, when the first opening and closing cylinder 102 is located at the position aligned with the upper pumping port 101, the second opening and closing cylinder 104 is located at the position above the lower pumping port 103.

Accordingly, when the first opening and closing cylinder 102 closes the upper pumping port 101, the second opening and closing cylinder 104 can open the lower pumping port 103.

(Configuration of Water Injection Pipe)

As shown in FIG. 23, each water injection pipe of the first water injection pipe 151 and the second water injection pipe 142 has an upper water injection port 105 and a lower water injection port 107.

Each water injection pipe of the first water injection pipe 151 and the second water injection pipe 142 includes a third opening and closing cylinder 106 and a fourth opening and closing cylinder 108.

For example, each water injection pipe of the first water injection pipe 151 and the second water injection pipe 142 may be closed below the lower water injection port 107.

Hereinafter, the first water injection pipe 151 will be described, but the second water injection pipe 142 has the same configuration as the first water injection pipe 151.

The upper water injection port 105 opens such that water can be injected into the upper aquifer LY1.

That is, the upper water injection port 105 opens such that the underground water in the first water injection pipe 151 can be injected into the first upper opening 23.

For example, the first water injection pipe 151 may have a plurality of openings OP arranged along a circumference of the pipe as the upper water injection port 105.

The upper water injection port 105 may be provided at any depth position as long as it is above the packing PK.

For example, the upper water injection port 105 may be provided at a depth position corresponding to the upper aquifer LY1.

Further, the upper water injection port 105 may be provided within a range in which the first upper opening 23 is provided in the depth position.

The third opening and closing cylinder 106 can open and close the upper water injection port 105.

For example, the third opening and closing cylinder 106 may be provided on an outer circumference of the first water injection pipe 151 coaxially with the first water injection pipe 151.

Further, the third opening and closing cylinder 106 is configured to hermetically close the upper water injection port 105 via a pair of O-rings ORG provided on the circumference of the first water injection pipe 151 above and below the upper water injection port 105 by sliding to a position aligned with the upper water injection port 105 at which the third opening and closing cylinder 106 covers the openings OP of the upper water injection port 105.

The third opening and closing cylinder 106 is vertically slidable.

For example, the third opening and closing cylinder 106 may be vertically slidable between a position aligned with the upper water injection port 105 and a position below the upper water injection port 105.

Accordingly, the third opening and closing cylinder 106 closes the upper water injection port 105 when it is located at the position aligned with the upper water injection port 105 and opens the upper water injection port 105 when it is located at the position below the upper water injection port 105.

The lower water injection port 107 opens such that water can be injected into the lower aquifer LY2.

That is, the lower water injection port 107 opens such that the underground water in the first water injection pipe 151 can be injected into the first lower opening 24.

For example, the first water injection pipe 151 may have a plurality of openings OP arranged along the circumference of the pipe as the lower water injection port 107.

The lower water injection port 107 may be provided at any depth position as long as it is below the packing PK.

For example, the lower water injection port 107 may be provided at a depth position corresponding to the lower aquifer LY2.

Further, the lower water injection port 107 may be provided within a range in which the first lower opening 24 is provided in the depth position.

The fourth opening and closing cylinder 108 can open and close the lower water injection port 107.

For example, the fourth opening and closing cylinder 108 may be provided on the outer circumference of the first water injection pipe 151 coaxially with the first water injection pipe 151.

Further, the fourth opening and closing cylinder 108 is configured to hermetically close the lower water injection port 107 via a pair of O-rings ORG provided on the circumference of the first water injection pipe 151 above and below the lower water injection port 107 by sliding to a position aligned with the lower water injection port 107 at which the fourth opening and closing cylinder 108 covers the openings OP of the lower water injection port 107.

The fourth opening and closing cylinder 108 is vertically slidable.

For example, the fourth opening and closing cylinder 108 may be vertically slidable between a position aligned with the lower water injection port 107 and a position above the lower water injection port 107.

Accordingly, the fourth opening and closing cylinder 108 closes the lower water injection port 107 when it is located at the position aligned with the lower water injection port 107 and opens the lower water injection port 107 when it is located at the position above the lower water injection port 107.

The third opening and closing cylinder 106 and the fourth opening and closing cylinder 108 are connected to each other via a link LNK2 that extends vertically on the outer circumference of the first water injection pipe 151.

For example, the link LNK2 may be a metal rod extending vertically.

For example, the link LNK2 may extend vertically through the packing PK while the prevention of the flow of the underground water by the packing PK is maintained.

Therefore, the third opening and closing cylinder 106 and the fourth opening and closing cylinder 108 slide in an interlocking manner in the vertical direction.

For example, the third opening and closing cylinder 106 and the fourth opening and closing cylinder 108 may be connected to each other such that, when the third opening and closing cylinder 106 is located at the position below the upper water injection port 105, the fourth opening and closing cylinder 108 is located at the position aligned with the lower water injection port 107.

Accordingly, when the third opening and closing cylinder 106 opens the upper water injection port 105, the fourth opening and closing cylinder 108 can close the lower water injection port 107.

For example, the third opening and closing cylinder 106 and the fourth opening and closing cylinder 108 may be connected to each other such that, when the third opening and closing cylinder 106 is located at the position aligned with the upper water injection port 105, the fourth opening and closing cylinder 108 is located at the position above the lower water injection port 107.

Accordingly, when the third opening and closing cylinder 106 closes the upper water injection port 105, the fourth opening and closing cylinder 108 can open the lower water injection port 107.

(Structure of Interlocking Mechanism)

For example, the geothermal heat utilization system 100 may further include an interlocking mechanism 160.

The interlocking mechanism 160 is provided in each well of the first well 120 and the second well 130.

Hereinafter, the interlocking mechanism 160 provided in the first well 120 will be described, but the interlocking mechanism 160 provided in the second well 130 is also configured in the same manner.

The interlocking mechanism 160 interlocks a pair of the first opening and closing cylinder 102 and the second opening and closing cylinder 104 with a pair of the third opening and closing cylinder 106 and the fourth opening and closing cylinder 108.

The interlocking mechanism 160 may interlock a pair of the first opening and closing cylinder 102 and the second opening and closing cylinder 104 with a pair of the third opening and closing cylinder 106 and the fourth opening and closing cylinder 108 in opposite directions with respect to the vertical direction.

For example, as shown in FIG. 23, the interlocking mechanism 160 may include a rack gear 161 fixed to the link LNK1, a rack gear 162 fixed to the link LNK2, and a pinion gear 163.

The rack gear 161 and the rack gear 162 are arranged in the direction in which the first pumping pipe 141 and the first water injection pipe 151 are arranged.

The rack gear 161 and the rack gear 162 are coupled with each other via the pinion gear 163.

The rack gear 161 and the rack gear 162 face each other with the pinion gear 163 interposed therebetween.

Accordingly, the rack gear 161 and the rack gear 162 are interlocked in opposite directions with respect to the vertical direction.

For example, each rack gear of the rack gear 161 and the rack gear 162 may include a hanging ring HGR.

An operator or a device can move each rack gear upward by pulling up a rod, a wire, or the like fixed to the hanging ring HGR from above the ground.

(Operation)

An operation of the geothermal heat utilization system 100 will be described.

First, the case shown in FIG. 21 (a first mode) will be described.

In the first well 120, the pair of the third opening and closing cylinder 106 and the fourth opening and closing cylinder 108 are moved upward, and the pair of the first opening and closing cylinder 102 and the second opening and closing cylinder 104 are moved downward.

For example, as shown in FIG. 23, when a rod, a wire, or the like is pulled up from above the ground, the rack gear 162 may be moved upward, and the rack gear 161 may be moved downward due to the interlocking by the interlocking mechanism 160.

When the pair of the first opening and closing cylinder 102 and the second opening and closing cylinder 104 move downward, the first opening and closing cylinder 102 moves to the position below the upper pumping port 101, and the second opening and closing cylinder 104 moves to the position aligned with the lower pumping port 103.

Accordingly, in the first well 120, the first opening and closing cylinder 102 opens the upper pumping port 101, and the second opening and closing cylinder 104 closes the lower pumping port 103.

On the other hand, when the pair of the third opening and closing cylinder 106 and the fourth opening and closing cylinder 108 move upward, the third opening and closing cylinder 106 moves to the position aligned with the upper water injection port 105, and the fourth opening and closing cylinder 108 moves to the position above the lower water injection port 107.

Accordingly, in the first well 120, the third opening and closing cylinder 106 closes the upper water injection port 105, and the fourth opening and closing cylinder 108 opens the lower water injection port 107.

In the first well 120, when the upper pumping port 101 is opened and the lower pumping port 103 is closed, as shown in FIG. 21, in the first pumping pipe 141, the underground water is pumped from the upper aquifer LY1 via the first upper opening 23.

On the other hand, when the upper water injection port 105 is closed and the lower water injection port 107 is opened, in the first water injection pipe 151, the underground water is injected into the lower aquifer LY2 via the first lower opening 24.

At this time, in the second well 130, the pair of the first opening and closing cylinder 102 and the second opening and closing cylinder 104 are moved upward, and the pair of the third opening and closing cylinder 106 and the fourth opening and closing cylinder 108 are moved downward.

Accordingly, in the second well 130, the lower pumping port 103 and the upper water injection port 105 are opened, and the upper pumping port 101 and the lower water injection port 107 are closed.

In the second well 130, when the lower pumping port 103 is opened and the upper pumping port 101 is closed, in the second pumping pipe 152, the underground water is pumped from the lower aquifer LY2 via the second lower opening 34.

On the other hand, when the lower water injection port 107 is closed and the upper water injection port 105 is opened, in the second water injection pipe 142, the underground water is injected into the upper aquifer LY1 via the second upper opening 33.

By the above operation, similar to the first embodiment, also in the case of the first mode of the present embodiment, the geothermal heat utilization system 100 can supply the underground water of the upper aquifer LY1 from the first upper opening 23 to the second upper opening 33 via the first pipe 140.

Further, the geothermal heat utilization system 100 can supply the underground water of the lower aquifer LY2 from the second lower opening 34 to the first lower opening 24 via the second pipe 150.

Furthermore, similar to the first embodiment, also in the case of the first mode of the present embodiment, the geothermal heat utilization system 100 pumps the hot water from the upper aquifer LY1, and at the same time, pumps the cold water from the lower aquifer LY2 by operating the first pump 180 and the second pump 190 at the same time.

Next, the case shown in FIG. 22 (a second mode) will be described.

In the first well 120, the pair of the first opening and closing cylinder 102 and the second opening and closing cylinder 104 are moved upward, and the pair of the third opening and closing cylinder 106 and the fourth opening and closing cylinder 108 are moved downward.

For example, when a rod, a wire, or the like is pulled up from above the ground, the rack gear 161 may be moved upward, and the rack gear 162 may be moved downward due to the interlocking by the interlocking mechanism 160.

When the pair of the first opening and closing cylinder 102 and the second opening and closing cylinder 104 move upward, the first opening and closing cylinder 102 moves to the position aligned with the upper pumping port 101, and the second opening and closing cylinder 104 moves to the position above the lower pumping port 103.

Accordingly, in the first well 120, the first opening and closing cylinder 102 closes the upper pumping port 101, and the second opening and closing cylinder 104 opens the lower pumping port 103.

On the other hand, when the pair of the third opening and closing cylinder 106 and the fourth opening and closing cylinder 108 move downward, the third opening and closing cylinder 106 moves to the position below the upper water injection port 105, and the fourth opening and closing cylinder 108 moves to the position aligned with the lower water injection port 107.

Accordingly, in the first well 120, the third opening and closing cylinder 106 opens the upper water injection port 105, and the fourth opening and closing cylinder 108 closes the lower water injection port 107.

In the first well 120, when the upper pumping port 101 is closed and the lower pumping port 103 is opened, in the first pumping pipe 141, the underground water is pumped from the lower aquifer LY2 via the first lower opening 24.

On the other hand, when the upper water injection port 105 is opened and the lower water injection port 107 is closed, in the first water injection pipe 151, the underground water is injected into the upper aquifer LY1 via the first upper opening 23.

At this time, in the second well 130, the pair of the third opening and closing cylinder 106 and the fourth opening and closing cylinder 108 are moved upward, and the pair of the first opening and closing cylinder 102 and the second opening and closing cylinder 104 are moved downward.

Accordingly, in the second well 130, the lower pumping port 103 and the upper water injection port 105 are closed, and the upper pumping port 101 and the lower water injection port 107 are opened.

In the second well 130, when the lower pumping port 103 is closed and the upper pumping port 101 is opened, in the second pumping pipe 152, the underground water is pumped from the upper aquifer LY1 via the second upper opening 33.

On the other hand, when the lower water injection port 107 is opened and the upper water injection port 105 is closed, in the second water injection pipe 142, the underground water is injected into the lower aquifer LY2 via the second lower opening 34.

By the above operation, similar to the first embodiment, also in the case of the second mode of the present embodiment, the geothermal heat utilization system 100 can supply the underground water of the lower aquifer LY2 from the first lower opening 24 to the second lower opening 34 via the first pipe 140.

Further, the geothermal heat utilization system 100 can supply the underground water of the upper aquifer LY1 from the second upper opening 33 to the first upper opening 23 via the second pipe 150.

Furthermore, similar to the first embodiment, also in the case of the second mode of the present embodiment, the geothermal heat utilization system 100 pumps the hot water from the lower aquifer LY2, and at the same time, pumps the cold water from the upper aquifer LY1 by operating the first pump 180 and the second pump 190 at the same time.

(Operational Effects)

Similar to the first embodiment, the geothermal heat utilization system 100 of the present embodiment can supply the underground water of the upper aquifer LY1 and the underground water of the lower aquifer LY2 separately, and thus can prevent the underground water of the upper aquifer LY1 and the underground water of the lower aquifer LY2 from being mixed with each other.

Thus, according to the geothermal heat utilization system 100 of the present embodiment, blockage of the well is prevented when the upper aquifer LY1 and the lower aquifer LY2 are used.

Further, according to the geothermal heat utilization system 100 of the present embodiment, in each well of the first well 120 and the second well 130, each of the upper pumping port 101, the lower pumping port 103, the upper water injection port 105, and the lower water injection port 107 is opened and closed by each opening and closing cylinder.

Therefore, the mechanism in each well can be made compact.

Further, according to an example of the present embodiment, since the geothermal heat utilization system 100 has the interlocking mechanism 160, it is possible to interlock the opening and closing operation of the upper pumping port 101 and the lower pumping port 103 with the opening and closing operation of the upper water injection port 105 and the lower water injection port 107.

Further, according to the example of the present embodiment, since the geothermal heat utilization system 100 has the interlocking mechanism 160, any one pair of the opening and closing cylinders of the pair of the first opening and closing cylinder 102 and the second opening and closing cylinder 104 and the pair of the third opening and closing cylinder 106 and fourth opening and closing cylinder 108 can be moved upward, and thus the other pair of the opening and closing cylinders can be moved downward.

As a comparative example, it is assumed that the geothermal heat utilization system is not provided with the interlocking mechanism 160 and is configured to move each pair of the opening and closing cylinders downward with a biasing force of a spring.

In this case, since the biasing force of the spring changes in relation to a displacement length, it is difficult to move each pair of the opening and closing cylinders downward with a constant force.

On the other hand, according to the present embodiment, since the interlocking mechanism 160 is configured to move each pair of the opening and closing cylinders downward, it is easy to move each pair of the opening and closing cylinders downward with a constant force.

(Modification Example of Second Embodiment)

In the example of the present embodiment, the interlocking mechanism 160 including the rack gear 161, the rack gear 162, and the pinion gear 163 is used as an interlocking mechanism.

The interlocking mechanism may have any configuration as long as it interlocks a pair of the first opening and closing cylinder 102 and the second opening and closing cylinder 104 with a pair of the third opening and closing cylinder 106 and the fourth opening and closing cylinder 108 in opposite directions with respect to the vertical direction.

Figure 24:
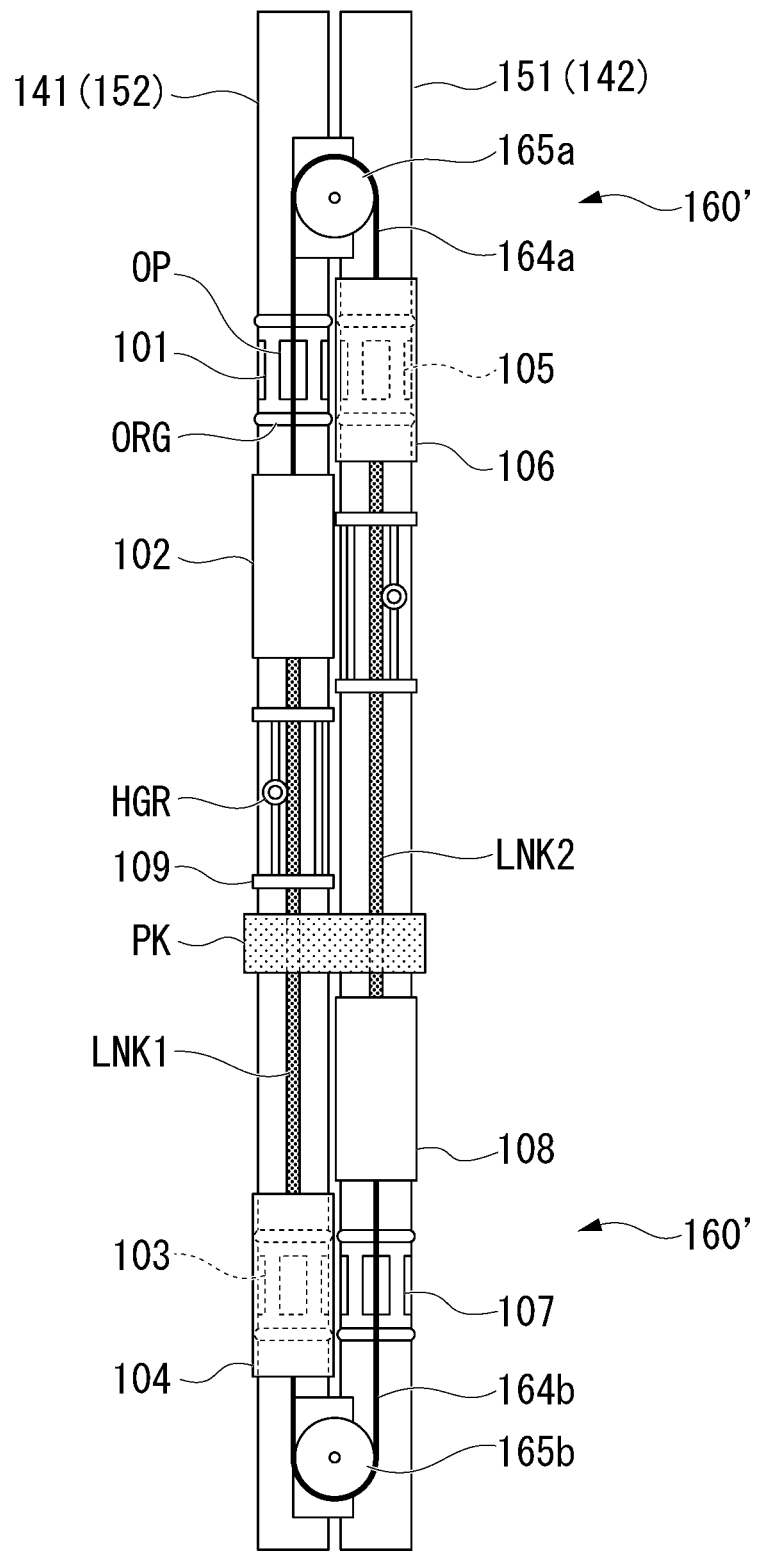
FIG. 24 is a front view of a configuration in each well of the geothermal heat utilization system according to the second embodiment.

As a modification example, an interlocking mechanism 160' as shown in FIG. 24 may be used as an interlocking mechanism.

The interlocking mechanism 160' includes a chain 164a, a chain 164b, a sprocket 165a, and a sprocket 165b.

The geothermal heat utilization system 100 further includes a support ring 109 and a hanging ring HGR.

One end of the chain 164a is fixed to an upper end of the first opening and closing cylinder 102, and the other end of the chain 164a is fixed to an upper end of the third opening and closing cylinder 106.

One end of the chain 164b is fixed to a lower end of the second opening and closing cylinder 104, and the other end of the chain 164b is fixed to a lower end of the fourth opening and closing cylinder 108.

The sprocket 165a is coupled with the chain 164a.

The sprocket 165a is rotatable in an interlocking manner with a movement of the chain 164a in an extending direction of the chain 164a.

The sprocket 165b is coupled with the chain 164b.

The sprocket 165b is rotatable in an interlocking manner with a movement of the chain 164b in an extending direction of the chain 164b.

The support ring 109 is provided on each link of the link LNK1 and the link LNK2.

The hanging ring HGR is fixed to each support ring 109.

The support ring 109 is slidably provided on the outer circumference of each pipe of the first pumping pipe 141, the first water injection pipe 151, the second pumping pipe 152, and the second water injection pipe 142.

The support ring 109 can slide up and down while maintaining a constant posture toward the top and bottom.

Figure 25:
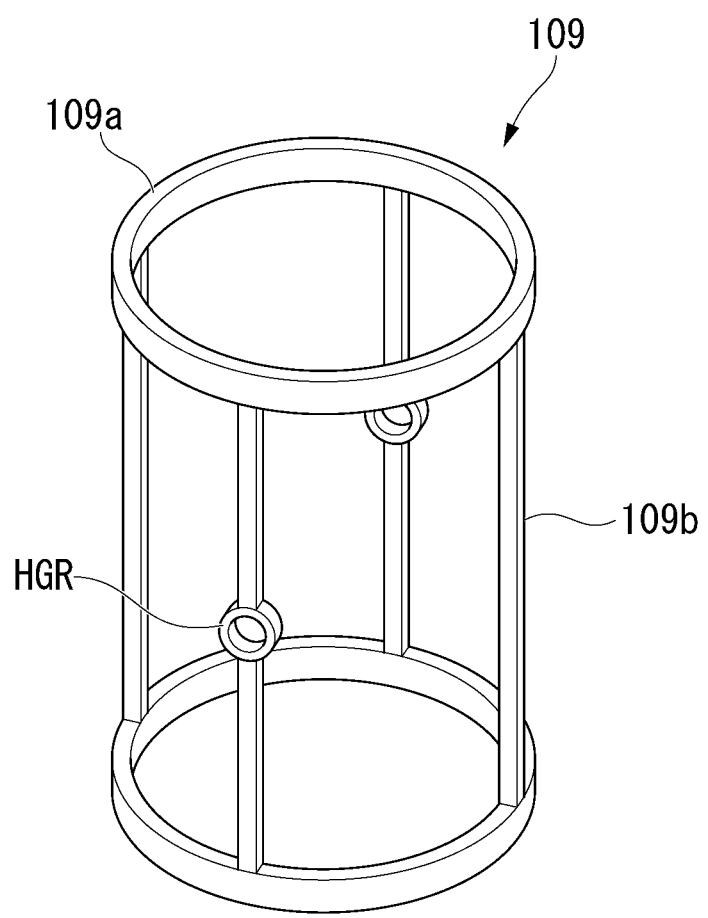
FIG. 25 is a perspective view of a support ring.

For example, as shown in FIG. 25, the support ring 109 may include a pair of rings 109a that are vertically separated from each other and a plurality of connecting rods 109b that connect the pair of rings 109a to each other.

Each ring 109a is provided coaxially with each pipe of the first pumping pipe 141, the first water injection pipe 151, the second pumping pipe 152, and the second water injection pipe 142.

Each connecting rod 109b extends vertically.

The plurality of connecting rods 109b are arranged in a circumferential direction of each ring 109a.

The hanging ring HGR is fixed to at least one of the plurality of connecting rods 109b.

For example, the hanging ring HGR may be fixed to each connecting rod 109b of the pair of connecting rods 109b facing each other in a radial direction of the ring 109a.

According to the present modification example, the interlocking mechanism 160' can interlock the pair of the first opening and closing cylinder 102 and the second opening and closing cylinder 104 with the pair of the third opening and closing cylinder 106 and the fourth opening and closing cylinder 108 in opposite directions with respect to the vertical direction.

According to the present modification example, the support ring 109 can maintain a constant posture toward the top and bottom.

For example, even if a rod, a wire, or the like fixed to one hanging ring HGR is pulled up, each link of the link LNK1 and the link LNK2 is unlikely to tilt with respect to the vertical direction.

Therefore, in the geothermal heat utilization system 100, it is easy to move each pair of the opening and closing cylinders of the pair of the first opening and closing cylinder 102 and the second opening and closing cylinder 104 and the pair of the third opening and closing cylinder 106 and the fourth opening and closing cylinder 108 up and down.

In the present modification example, when a rod, a wire, or the like fixed to the hanging ring HGR is pulled up, each pair of the opening and closing cylinders are moved up and down, but any movement may be used as long as each pair of the opening and closing cylinders can be moved up and down.

For example, when another sprocket coupled with at least one sprocket of the sprocket 165a and the sprocket 165b is rotated, each pair of the opening and closing cylinders may be moved up and down.

For example, when a rotation shaft of a motor or the like coupled with at least one sprocket of the sprocket 165a and the sprocket 165b is rotated, each pair of the opening and closing cylinders may be moved up and down.

Third Embodiment

A third embodiment of a geothermal heat utilization system will be described with reference to FIG. 26.

In the example of the second embodiment, the geothermal heat utilization system 100 includes the interlocking mechanism, whereas in an example of the present embodiment, the geothermal heat utilization system 100 includes a first weight and a second weight, this is a difference between them.

The geothermal heat utilization system of the present embodiment is configured in the same manner and has the same function as the geothermal heat utilization system 100 of the second embodiment except for the differences, and thus duplicate explanation will be omitted.

For example, the geothermal heat utilization system 100 may further include a first weight 166a and a second weight 166b.

Further, similar to the modification example of the second embodiment, the geothermal heat utilization system 100 may further include a support ring 109 and a hanging ring HGR fixed to the support ring 109.

Figure 26:
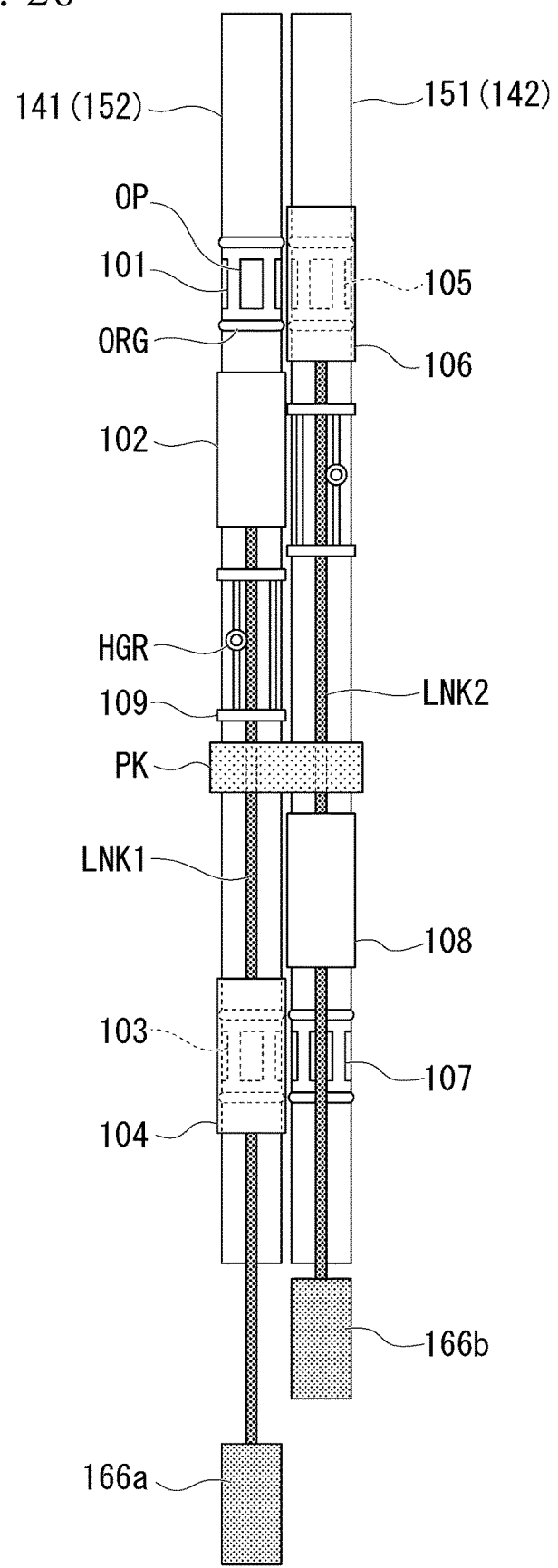
FIG. 26 is a front view of a configuration in each well of the geothermal heat utilization system according to a third embodiment.

As shown in FIG. 26, the first weight 166a hangs from the pair of the first opening and closing cylinder 102 and the second opening and closing cylinder 104.

For example, the first weight 166a may hang from a lower end of the second opening and closing cylinder 104.

The second weight 166b hangs from the pair of the third opening and closing cylinder 106 and the fourth opening and closing cylinder 108.

For example, the second weight 166b may hang from a lower end of the fourth opening and closing cylinder 108.

According to the example of the present embodiment, the pair of the first opening and closing cylinder 102 and the second opening and closing cylinder 104 are pulled downward with the gravity on the first weight 166a. Further, the pair of the third opening and closing cylinder 106 and the fourth opening and closing cylinder 108 are pulled downward with the gravity on the second weight 166b.

Therefore, for example, an operator or a device can move each pair of the opening and closing cylinders up and down by pulling up or loosening a rod, a wire, or the like fixed to the hanging ring HGR from above the ground.

Therefore, according to the example of the present embodiment, in the geothermal heat utilization system 100, it is easy to move each pair of the opening and closing cylinders of the pair of the first opening and closing cylinder 102 and the second opening and closing cylinder 104 and the pair of the third opening and closing cylinder 106 and the fourth opening and closing cylinder 108 downward.

Fourth Embodiment

A fourth embodiment of a geothermal heat utilization system will be described with reference to FIG. 27.

In the example of the second embodiment, the geothermal heat utilization system 100 includes the interlocking mechanism, whereas in an example of the present embodiment, the geothermal heat utilization system 100 includes a first cylinder and a second cylinder, this is a difference between them.

The geothermal heat utilization system of the present embodiment is configured in the same manner and has the same function as the geothermal heat utilization system 100 of the second embodiment except for the differences, and thus duplicate explanation will be omitted.

For example, the geothermal heat utilization system 100 may further include a first cylinder 167a and a second cylinder 167b.

Figure 27:
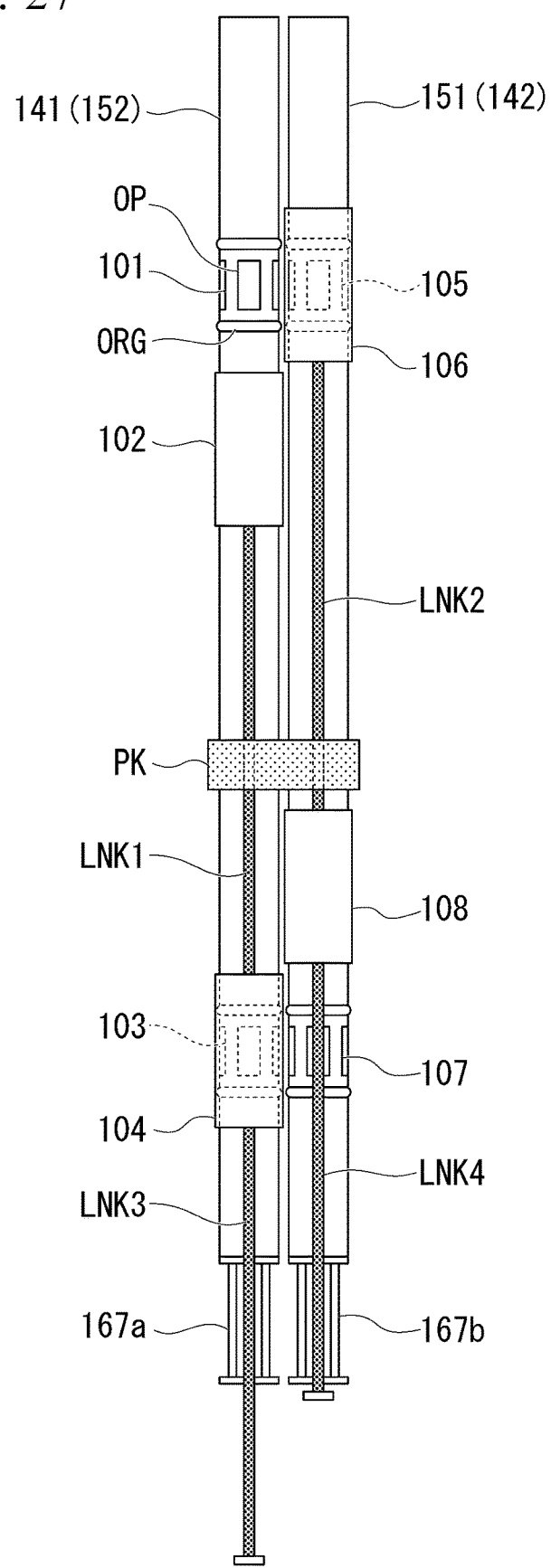
FIG. 27 is a front view of a configuration in each well of the geothermal heat utilization system according to a fourth embodiment.

As shown in FIG. 27, the first cylinder 167a is connected to the pair of the first opening and closing cylinder 102 and the second opening and closing cylinder 104 via a link LNK3.

The first cylinder 167a is an oil hydraulic cylinder, a water whydraulic cylinder, or the like, and can drive the link LNK3 up and down.

For example, an upper end of the link LNK3 may be fixed to a lower end of the second opening and closing cylinder 104.

For example, the link LNK3 may be a metal rod extending vertically.

The second cylinder 167b is connected to the pair of the third opening and closing cylinder 106 and the fourth opening and closing cylinder 108 via a link LNK4.

The second cylinder 167b is an oil hydraulic cylinder, a water hydraulic cylinder, or the like, and can drive the link LNK4 up and down.

For example, an upper end of the link LNK4 may be fixed to a lower end of the fourth opening and closing cylinder 108.

For example, the link LNK4 may be a metal rod extending vertically.

According to the example of the present embodiment, the first cylinder 167a can move the pair of the first opening and closing cylinder 102 and the second opening and closing cylinder 104 up and down with a driving force of the first cylinder 167a. Further, the second cylinder 167b can move the pair of the third opening and closing cylinder 106 and the fourth opening and closing cylinder 108 up and down with a driving force of the second cylinder 167b.

Therefore, according to the example of the present embodiment, in the geothermal heat utilization system 100, it is easy to move each pair of the opening and closing cylinders of the pair of the first opening and closing cylinder 102 and the second opening and closing cylinder 104 and the pair of the third opening and closing cylinder 106 and the fourth opening and closing cylinder 108 up and down.

Fifth Embodiment

A fifth embodiment of a geothermal heat utilization system will be described with reference to FIG. 28.

In the example of the second embodiment, the geothermal heat utilization system 100 includes the interlocking mechanism, whereas in an example of the present embodiment, the geothermal heat utilization system 100 includes a first drive mechanism, a second drive mechanism, a third drive mechanism, and a fourth drive mechanism, this is a difference between them.

The geothermal heat utilization system of the present embodiment is configured in the same manner and has the same function as the geothermal heat utilization system 100 of the second embodiment except for the differences, and thus duplicate explanation will be omitted.

For example, the geothermal heat utilization system 100 may further include a first drive mechanism 168a, a second drive mechanism 168b, a third drive mechanism 168c, and a fourth drive mechanism 168d.

Further, the first drive mechanism 168a, the second drive mechanism 168b, the third drive mechanism 168c, and the fourth drive mechanism 168d may be able to be driven independently of each other.

Figure 28:
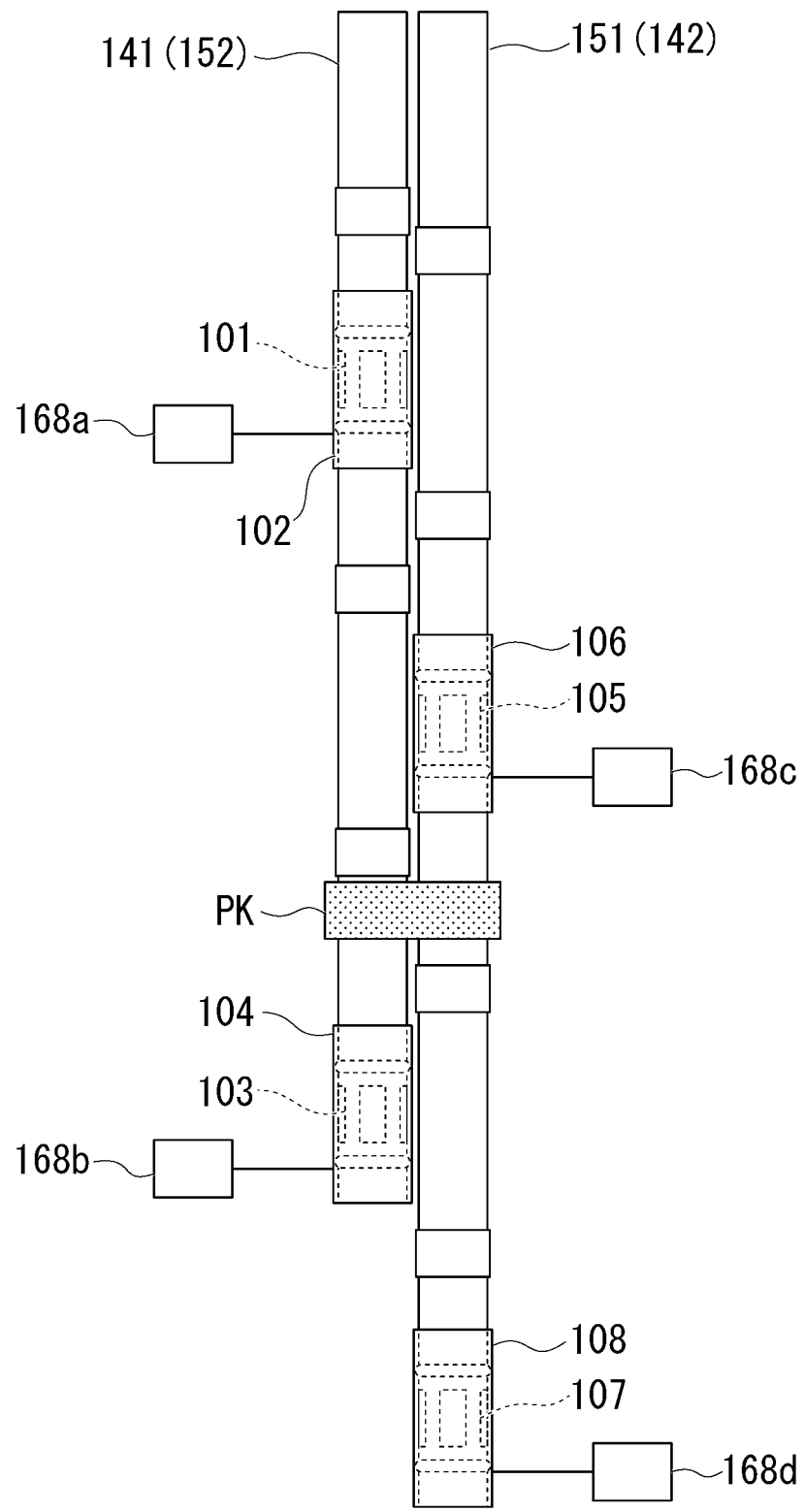
FIG. 28 is a front view of a configuration in each well of the geothermal heat utilization system according to a fifth embodiment.

As shown in FIG. 28, the first drive mechanism 168a is coupled with the first opening and closing cylinder 102.

The first drive mechanism 168a is an oil hydraulic actuator, a water hydraulic actuator, or the like, and can drive the first opening and closing cylinder 102 in the vertical direction.

The second drive mechanism 168b is coupled with the second opening and closing cylinder 104.

The second drive mechanism 168b is an oil hydraulic actuator, a water hydraulic actuator, or the like, and can drive the second opening and closing cylinder 104 in the vertical direction.

The third drive mechanism 168c is coupled with the third opening and closing cylinder 106.

The third drive mechanism 168c is an oil hydraulic actuator, a water hydraulic actuator, or the like, and can drive the third opening and closing cylinder 106 in the vertical direction.

The fourth drive mechanism 168d is coupled with the fourth opening and closing cylinder 108.

The fourth drive mechanism 168d is an oil hydraulic actuator, a water hydraulic actuator, or the like, and can drive the fourth opening and closing cylinder 108 in the vertical direction.

Therefore, according to the example of the present embodiment, it is possible to move each opening and closing cylinder of the first opening and closing cylinder 102, the second opening and closing cylinder 104, the third opening and closing cylinder 106, and the fourth opening and closing cylinder 108 up and down with a driving force of each drive mechanism.

Therefore, according to the example of the present embodiment, in the geothermal heat utilization system 100, it is easy to move each opening and closing cylinder of the first opening and closing cylinder 102, the second opening and closing cylinder 104, the third opening and closing cylinder 106, and the fourth opening and closing cylinder 108 up and down.

Sixth Embodiment

A sixth embodiment of a geothermal heat utilization system will be described with reference to FIGS. 29 to 32.

In the example of the third embodiment, the geothermal heat utilization system 100 moves each pair of the opening and closing cylinders up and down, whereas in an example of the present embodiment, the geothermal heat utilization system 100 lifts pairs of the opening and closing cylinders together, this is a difference between them.

Further, in the example of the present embodiment, a moving range of the third opening and closing cylinder 106 with respect to the upper water injection port 105 is different from that of the example of the third embodiment.

Further, in the example of the present embodiment, a moving range of the fourth opening and closing cylinder 108 with respect to the lower water injection port 107 is different from that of the example of the third embodiment.

The geothermal heat utilization system of the present embodiment is configured in the same manner and has the same function as the geothermal heat utilization system 100 of the third embodiment except for the differences, and thus duplicate explanation will be omitted.

For example, the geothermal heat utilization system 100 may further include a lift mechanism 170.

Further, the third opening and closing cylinder 106 may be vertically slidable between a position above the upper water injection port 105 and a position aligned with the upper water injection port 105.

Accordingly, the third opening and closing cylinder 106 closes the upper water injection port 105 when it is located at the position aligned with the upper water injection port 105 and opens the upper water injection port 105 when it is located at the position above the upper water injection port 105.

Further, the fourth opening and closing cylinder 108 may be vertically slidable between a position aligned with the lower water injection port 107 and a position below the lower water injection port 107.

Accordingly, the fourth opening and closing cylinder 108 opens the lower water injection port 107 when it is located at the position below the lower water injection port 107 and closes the lower water injection port 107 when it is located at the position aligned with the lower water injection port 107.

Figure 29:
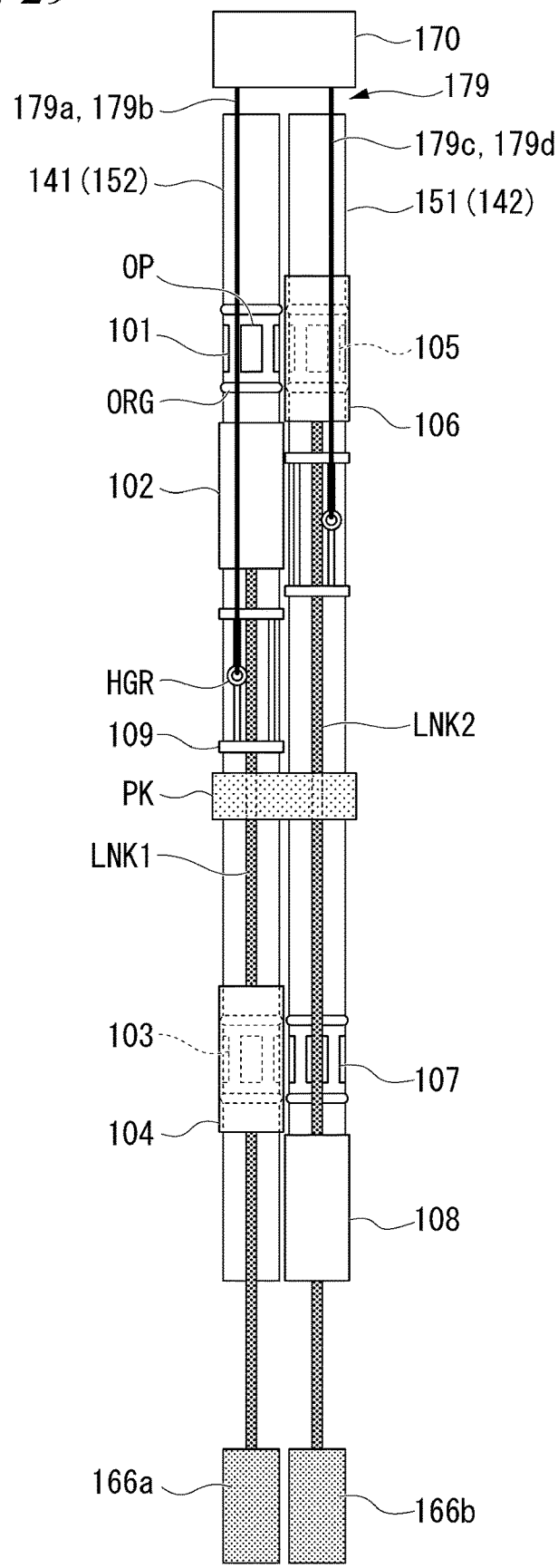
FIG. 29 is a front view of a configuration in each well of the geothermal heat utilization system according to a sixth embodiment.

Further, as shown in FIG. 29, the third opening and closing cylinder 106 and the fourth opening and closing cylinder 108 may be connected to each other such that, when the third opening and closing cylinder 106 is located at the position aligned with the upper water injection port 105, the fourth opening and closing cylinder 108 is located at the position below the lower water injection port 107.

Accordingly, when the third opening and closing cylinder 106 closes the upper water injection port 105, the fourth opening and closing cylinder 108 can open the lower water injection port 107.

Further, the third opening and closing cylinder 106 and the fourth opening and closing cylinder 108 may be connected to each other such that, when the third opening and closing cylinder 106 is located at the position above the upper water injection port 105, the fourth opening and closing cylinder 108 is located at the position aligned with the lower water injection port 107.

Accordingly, when the third opening and closing cylinder 106 opens the upper water injection port 105, the fourth opening and closing cylinder 108 can close the lower water injection port 107.

(Structure of Lift Mechanism)

The lift mechanism 170 is provided directly above each well of the first well 120 and the second well 130 on the ground.

Figure 30:
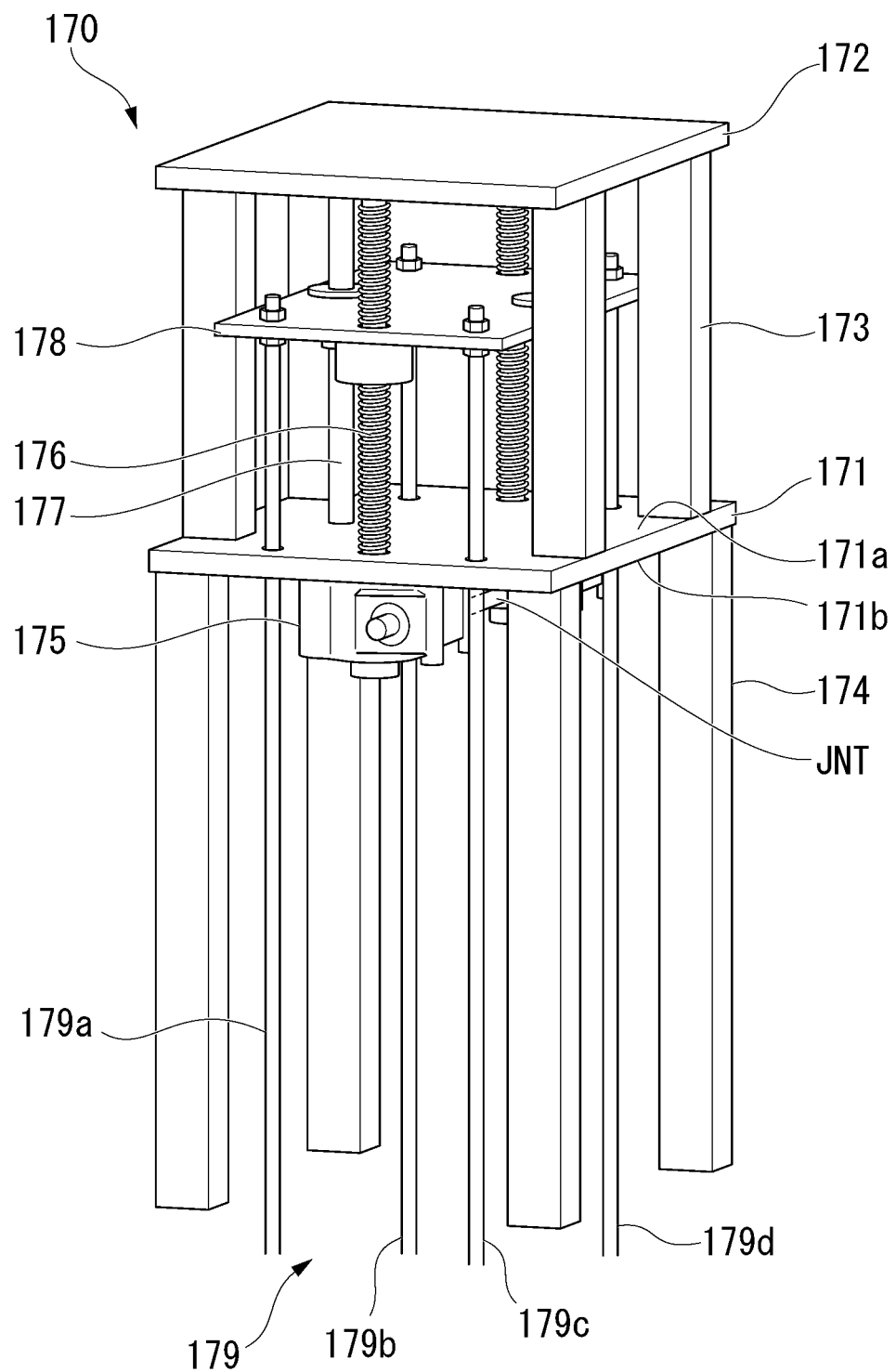
FIG. 30 is a perspective view of a lift mechanism.
Figure 31:
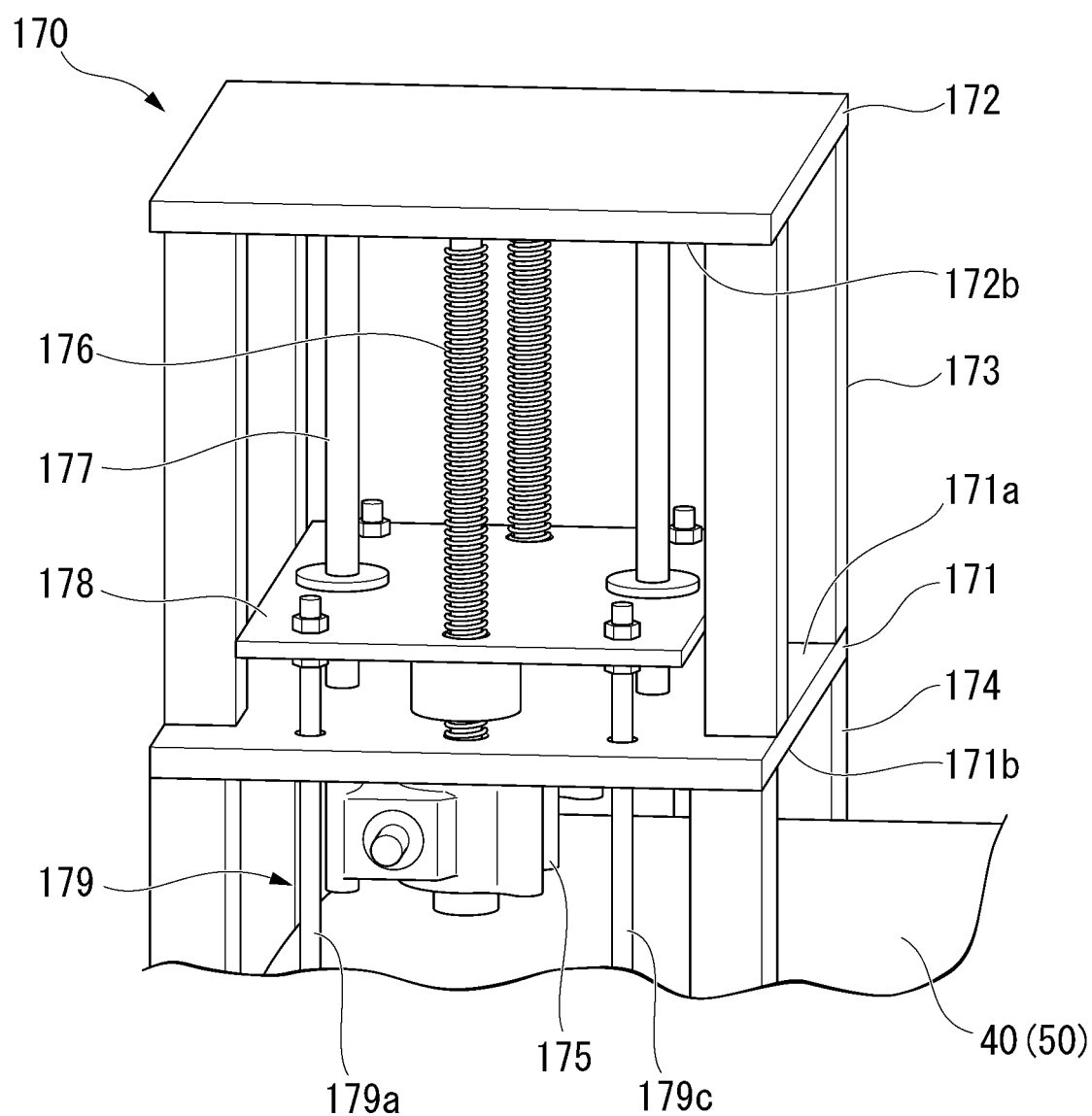
FIG. 31 is a partial perspective view of the lift mechanism.
Figure 32:
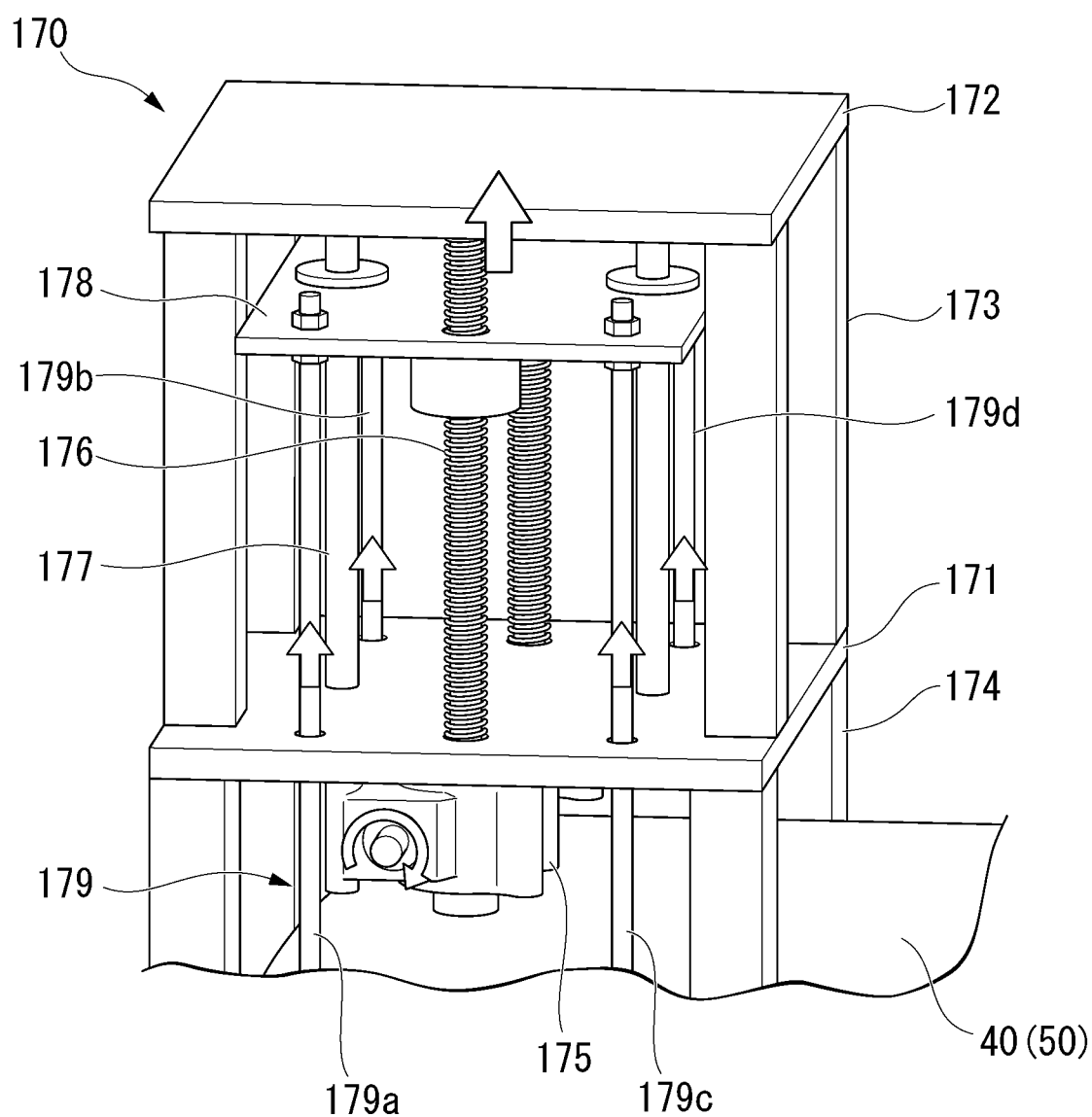
FIG. 32 is a view showing a function of the lift mechanism.

As shown in FIGS. 30 and 31, the lift mechanism 170 includes a guide plate 171, a top plate 172, four upper columns 173, and four lower columns 174.

The lift mechanism 170 includes a pair of jacks 175, a pair of ball screws 176, a pair of jack guides 177, a lifting plate 178, and a rod group 179.

The guide plate 171 has an upper plate surface 171a facing upward and a lower plate surface 171b facing downward.

Each of the upper columns 173 extends downward from each corner of four corners of the upper plate surface 171a.

Each of the lower columns 174 extends downward from each corner of four corners of the lower plate surface 171b.

Lower ends of the lower columns 174 are fixed to the ground surface SG.

The top plate 172 is provided in parallel with the guide plate 171 at a distance. Each of the upper columns 173 is fixed to each corner of four corners of a lower plate surface 172b of the top plate 172 facing downward.

The pair of ball screws 176 are fixed to the lower plate surface 172b of the top plate 172 closer to the center than the upper columns 173 to be axially rotatable.

The pair of ball screws 176 extend downward from the lower plate surface 172b, penetrate the lifting plate 178 and the guide plate 171, and extend to the pair of jacks 175.

The pair of jack guides 177 are fixed to the lower plate surface 172b of the top plate 172 closer to the center than the upper columns 173.

The pair of jack guides 177 are arranged to be orthogonal to a row of the pair of ball screws 176.

Each jack guide of the pair of jack guides 177 has a rod shape.

The pair of jack guides 177 extend downward from the lower plate surface 172b, penetrate the lifting plate 178, and extend to the guide plate 171.

Lower ends of the pair of jack guides 177 are fixed to the guide plate 171.

The pair of jacks 175 are fixed to the lower plate surface 171b of the guide plate 171.

Each jack of the pair of jacks 175 drives the associated ball screw 176 to rotate axially.

The pair of jacks 175 are coupled with each other by a connecting shaft JNT.

The pair of jacks 175 are interlocked with each other by the connecting shaft JNT.

The lifting plate 178 is provided in parallel with the guide plate 171.

The lifting plate 178 is provided between the top plate 172 and the guide plate 171.

The lifting plate 178 is surrounded by the four upper columns 173.

The lifting plate 178 can be moved up and down along the pair of jack guides 177.

The lifting plate 178 is screwed with each ball screw of the pair of ball screws 176.

When each ball screw of the pair of ball screws 176 is rotationally driven by the pair of jacks 175, the lifting plate 178 is driven up and down.

The rod group 179 is fixed to the lifting plate 178.

The rod group 179 extends downward from the lifting plate 178 and penetrates the guide plate 171.

The rod group 179 has a rod 179a, a rod 179b, a rod 179c, and a rod 179d.

The rod 179a, the rod 179b, the rod 179c, and the rod 179d are fixed to four corners of the lifting plate 178 side by side.

A lower end of the rod 179a and a lower end of the rod 179b are fixed to the hanging rings HGR provided on the LNK1.

A lower end of the rod 179c and a lower end of the rod 179d are fixed to the hanging rings HGR provided on the LNK2.

Therefore, as shown in FIG. 31, when the lifting plate 178 is moved upward by the driving of the pair of jacks 175, the LNK1 is lifted together with the LNK2.

(Operation)

First, a first mode will be described.

In the first well 120, the lift mechanism 170 operates not to lift the pair of the first opening and closing cylinder 102 and the second opening and closing cylinder 104 and the pair of the third opening and closing cylinder 106 and the fourth opening and closing cylinder 108.

For example, the lift mechanism 170 operates not to lift LNK1 and LNK2.

In this case, the pair of the first opening and closing cylinder 102 and the second opening and closing cylinder 104 are moved downward with the gravity of the first weight 166a.

Similarly, the pair of the third opening and closing cylinder 106 and the fourth opening and closing cylinder 108 are moved downward with the gravity of the second weight 166b.

Therefore, in the first well 120, as shown in FIG. 29, the upper pumping port 101 and the lower water injection port 107 are opened, and the lower pumping port 103 and the upper water injection port 105 are closed.

In the first well 120, when the upper pumping port 101 is opened and the lower pumping port 103 is closed, similar to that shown in FIG. 21, in the first pumping pipe 141, the underground water is pumped from the upper aquifer LY1 via the first upper opening 23.

On the other hand, when the upper water injection port 105 is closed and the lower water injection port 107 is opened, in the first water injection pipe 151, the underground water is injected into the lower aquifer LY2 via the first lower opening 24.

At this time, in the second well 130, the lift mechanism 170 operates to lift the pair of the first opening and closing cylinder 102 and the second opening and closing cylinder 104 together with the pair of the third opening and closing cylinder 106 and the fourth opening and closing cylinder 108.

For example, the lift mechanism 170 operates to lift LNK1 together with LNK2.

In this case, the pair of the first opening and closing cylinder 102 and the second opening and closing cylinder 104 are moved upward with a driving force of the lift mechanism 170.

Similarly, the pair of the third opening and closing cylinder 106 and the fourth opening and closing cylinder 108 are moved upward with the driving force of the lift mechanism 170.

Therefore, in the second well 130, the upper pumping port 101 and the lower water injection port 107 are closed, and the lower pumping port 103 and the upper water injection port 105 are opened.

In the second well 130, when the upper pumping port 101 is closed and the lower pumping port 103 is opened, similar to that shown in FIG. 21, in the second pumping pipe 152, the underground water is pumped from the lower aquifer LY2 via the second lower opening 34.

On the other hand, when the upper water injection port 105 is opened and the lower water injection port 107 is closed, in the second water injection pipe 142, the underground water is injected into the upper aquifer LY1 via the second upper opening 33.

By the above operation, similar to the first embodiment, also in the case of the first mode of the present embodiment, the geothermal heat utilization system 100 can supply the underground water of the upper aquifer LY1 from the first upper opening 23 to the second upper opening 33 via the first pipe 140.

Further, the geothermal heat utilization system 100 can supply the underground water of the lower aquifer LY2 from the second lower opening 34 to the first lower opening 24 via the second pipe 150.

Furthermore, similar to the first embodiment, also in the case of the first mode of the present embodiment, the geothermal heat utilization system 100 pumps the hot water from the upper aquifer LY1, and at the same time, pumps the cold water from the lower aquifer LY2 by operating the first pump 180 and the second pump 190 at the same time.

Next, a second mode will be described.

In the first well 120, the lift mechanism 170 operates to lift the pair of the first opening and closing cylinder 102 and the second opening and closing cylinder 104 and the pair of the third opening and closing cylinder 106 and the fourth opening and closing cylinder 108.

In this case, the pair of the first opening and closing cylinder 102 and the second opening and closing cylinder 104 are moved upward with a driving force of the lift mechanism 170.

Similarly, the pair of the third opening and closing cylinder 106 and the fourth opening and closing cylinder 108 are moved upward with the driving force of the lift mechanism 170.

Therefore, in the first well 120, the upper pumping port 101 and the lower water injection port 107 are closed, and the lower pumping port 103 and the upper water injection port 105 are opened.

In the first well 120, when the upper pumping port 101 is closed and the lower pumping port 103 is opened, similar to that shown in FIG. 22, in the first pumping pipe 141, the underground water is pumped from the lower aquifer LY2 via the first lower opening 24.

On the other hand, when the upper water injection port 105 is opened and the lower water injection port 107 is closed, in the first water injection pipe 151, the underground water is injected into the upper aquifer LY1 via the first upper opening 23.

At this time, in the second well 130, the lift mechanism 170 operates not to lift the pair of the first opening and closing cylinder 102 and the second opening and closing cylinder 104 and the pair of the third opening and closing cylinder 106 and the fourth opening and closing cylinder 108.

In this case, the pair of the first opening and closing cylinder 102 and the second opening and closing cylinder 104 are moved downward with the gravity of the first weight 166a.

Similarly, the pair of the third opening and closing cylinder 106 and the fourth opening and closing cylinder 108 are moved downward with the gravity of the second weight 166b.

Therefore, in the second well 130, the upper pumping port 101 and the lower water injection port 107 are opened, and the lower pumping port 103 and the upper water injection port 105 are closed.

In the second well 130, when the upper pumping port 101 is opened and the lower pumping port 103 is closed, similar to that shown in FIG. 22, in the second pumping pipe 152, the underground water is pumped from the upper aquifer LY1 via the second upper opening 33.

On the other hand, when the upper water injection port 105 is closed and the lower water injection port 107 is opened, in the second water injection pipe 142, the underground water is injected into the lower aquifer LY2 via the second lower opening 34.

By the above operation, similar to the first embodiment, also in the case of the second mode of the present embodiment, the geothermal heat utilization system 100 can supply the underground water of the lower aquifer LY2 from the first lower opening 24 to the second lower opening 34 via the first pipe 140.

Further, the geothermal heat utilization system 100 can supply the underground water of the upper aquifer LY1 from the second upper opening 33 to the first upper opening 23 via the second pipe 150.

Furthermore, similar to the first embodiment, also in the case of the second mode of the present embodiment, the geothermal heat utilization system 100 pumps the hot water from the lower aquifer LY2, and at the same time, pumps the cold water from the upper aquifer LY1 by operating the first pump 180 and the second pump 190 at the same time.

According to the example of the present embodiment, in the geothermal heat utilization system 100, it is possible to interlock the opening and closing operation of the upper pumping port 101 and the lower pumping port 103 with the opening and closing operation of the upper water injection port 105 and the lower water injection port 107 by lifting the pair of the first opening and closing cylinder 102 and the second opening and closing cylinder 104 together with the pair of the third opening and closing cylinder 106 and the fourth opening and closing cylinder 108.

Therefore, in the geothermal heat utilization system 100, the mechanism for performing each opening and closing operation can be simplified.

Another Modification Example

In the second to sixth embodiments described above, the first opening and closing cylinder 102 is provided on the outer circumference of each pumping pipe, but any configuration may be used as long as it can open and close the upper pumping port 101.

As a modification example, the first opening and closing cylinder 102 may be provided on an inner circumference of each pumping pipe.

Similarly, as the modification example, the second opening and closing cylinder 104 may be provided on the inner circumference of each pumping pipe.

Similarly, as the modification example, the third opening and closing cylinder 106 may be provided on an inner circumference of each water injection pipe.

Similarly, as the modification example, the fourth opening and closing cylinder 108 may be provided on the inner circumference of each water injection pipe.

Although embodiments of the present invention have been described above, these embodiments are shown as an example and are not intended to limit the scope of the invention. These embodiments can be implemented in various other forms, and various omissions, replacements, and changes can be made without departing from the gist of the invention. These embodiments and modification thereof are included in the scope of the invention described in the claims and the equivalent scope thereof in that they are included in the scope and gist of the invention.

For example, the operation method for a geothermal heat utilization system shown in FIG. 20 can also be executed using the geothermal heat utilization system 100 of the second to sixth embodiments described above.

INDUSTRIAL APPLICABILITY

In the geothermal heat utilization system and the operation method for a geothermal heat utilization system of the present invention, blockage of the well is prevented when the upper aquifer and the lower aquifer are used.

REFERENCE SIGNS LIST

10 Geothermal heat utilization system
20 First well
20a Casing
21 First storage unit
21a First pump
22 First switching unit
22a First port
22b Second port
22c Third port
22d Fourth port
22F Four-way valve
22P Water injection valve
22R Revolver
22S Slide mechanism
22T Three-way valve
23 First upper opening
23a Strainer
24 First lower opening
24a Strainer
30 Second well
30a Casing
31 Second storage unit
31a Second pump
32 Second switching unit
32a First port
32b Second port
32c Third port
32d Fourth port
33 Second upper opening
33a Strainer
34 Second lower opening
34a Strainer
40 First pipe
40a First end
40b Second end
50 Second pipe
50a First end
50b Second end
60 First heat exchanger
60a Primary side pipe
60b Secondary side pipe
70 Second heat exchanger
70a Primary side pipe
70b Secondary side pipe
80 Heater
90 Cooler
100 Geothermal heat utilization system
101 Upper pumping port
102 First opening and closing cylinder
103 Lower pumping port
104 Second opening and closing cylinder
105 Upper water injection port
106 Third opening and closing cylinder
107 Lower water injection port
108 Fourth opening and closing cylinder
109 Support ring
109a Ring
109b Connecting rod
120 First well
130 Second well
140 First pipe
140a First end
140b Second end
141 First pumping pipe
142 Second water injection pipe
150 Second pipe
150a First end
150b Second end
151 First water injection pipe
152 Second pumping pipe
160 Interlocking mechanism
160' Interlocking mechanism
161 Rack gear
162 Rack gear
163 Pinion gear
164a Chain
164b Chain
165a Sprocket
165b Sprocket
166a First weight
166b Second weight
167a First cylinder
167b Second cylinder
168a First drive mechanism
168b Second drive mechanism
168c Third drive mechanism
168d Fourth drive mechanism
170 Lift mechanism
171 Guide plate
171a Upper plate surface
171b Lower plate surface
172 Top plate
172b Lower plate surface
173 Upper column
174 Lower column 175 Jack
177 Jack Guide
178 Lifting plate
179 Rod group
179a Rod
179b Rod
179c Rod
179d Rod
180 First pump
190 Second pump
BLD Building
HGR Hanging ring
HOL1 Excavation hole
HOL2 Excavation hole
JNT Connecting shaft
LNK1 Link
LNK2 Link
LNK3 Link
LNK4 Link
LY1 Upper aquifer
LY2 Lower aquifer
LYm Diluvial clay layer
OP Opening
ORG O-ring
PK Packing
SG Ground surface

The invention claimed is:

1. A geothermal heat utilization system, comprising:
a first well that includes a first upper opening that opens in an upper aquifer and a first lower opening that opens in a lower aquifer;
a second well that includes a second upper opening that opens in the upper aquifer and a second lower opening that opens in the lower aquifer;
a first pipe;
a second pipe;
a first heat exchanger connected to the first pipe; and
a second heat exchanger connected to the second pipe,
wherein the geothermal heat utilization system is capable of supplying underground water of the upper aquifer from the first upper opening to the second upper opening via the first pipe,
wherein the geothermal heat utilization system is capable of supplying underground water of the lower aquifer from the second lower opening to the first lower opening via the second pipe, and
wherein the geothermal heat utilization system is configured to pump hot water as the underground water to be supplied from one of the upper aquifer and the lower aquifer, and at the same time, pump cold water as the underground water to be supplied from the other of the upper aquifer and the lower aquifer.

2. The geothermal heat utilization system according to claim 1, further comprising:
a heater connected to the first heat exchanger; and
a cooler connected to the second heat exchanger.

3. The geothermal heat utilization system according to claim 1,
wherein the geothermal heat utilization system is further capable of supplying the underground water of the upper aquifer from the second upper opening to the first upper opening via the second pipe, and
wherein the geothermal heat utilization system is further capable of supplying the underground water of the lower aquifer from the first lower opening to the second lower opening via the first pipe.

4. The geothermal heat utilization system according to claim 1,
wherein the first well further includes:
a first storage unit provided above the first upper opening and including a first pump; and
a first switching unit capable of switching between a mode for connecting the first storage unit and the first upper opening and a mode for connecting the first storage unit and the first lower opening, and
wherein the second well further includes:
a second storage unit provided above the second upper opening and including a second pump; and
a second switching unit capable of switching between a mode for connecting the second storage unit and the second upper opening and a mode for connecting the second storage unit and the second lower opening.

5. The geothermal heat utilization system according to claim 1,
wherein the first pipe includes a first pumping pipe extending into the first well at a first end,
wherein the second pipe includes a second pumping pipe extending into the second well at a first end,
wherein the first pipe includes a second water injection pipe extending into the second well at a second end,
wherein the second pipe includes a first water injection pipe extending into the first well at a second end,
wherein each pumping pipe of the first pumping pipe and the second pumping pipe includes an upper pumping port that opens such that the geothermal heat utilization system is capable of pumping water from the upper aquifer, a first opening and closing cylinder capable of opening and closing the upper pumping port, a lower pumping port that opens such that the geothermal heat utilization system is capable of pumping water from the lower aquifer, and a second opening and closing cylinder capable of opening and closing the lower pumping port, and
wherein each water injection pipe of the first water injection pipe and the second water injection pipe includes an upper water injection port that opens such that the geothermal heat utilization system is capable of injecting water into the upper aquifer, a third opening and closing cylinder capable of opening and closing the upper water injection port, a lower water injection port that opens such that the geothermal heat utilization system is capable of injecting water into the lower aquifer, and a fourth opening and closing cylinder capable of opening and closing the lower water injection port.

6. The geothermal heat utilization system according to claim 5, further comprising an interlocking mechanism configured to interlock a pair of the first opening and closing cylinder and the second opening and closing cylinder with a pair of the third opening and closing cylinder and the fourth opening and closing cylinder.

7. The geothermal heat utilization system according to claim 5, further comprising:
a first weight that hangs from a pair of the first opening and closing cylinder and the second opening and closing cylinder; and
a second weight that hangs from a pair of the third opening and closing cylinder and the fourth opening and closing cylinder.

8. The geothermal heat utilization system according to claim 7, further comprising a lift mechanism that lifts the pair of the first opening and closing cylinder and the second opening and closing cylinder together with the pair of the third opening and closing cylinder and the fourth opening and closing cylinder.

9. The geothermal heat utilization system according to claim 5, further comprising:
a first cylinder capable of sliding a pair of the first opening and closing cylinder and the second opening and closing cylinder; and
a second cylinder capable of sliding a pair of the third opening and closing cylinder and the fourth opening and closing cylinder.

10. The geothermal heat utilization system according to claim 5, further comprising:
a first drive mechanism capable of sliding the first opening and closing cylinder;
a second drive mechanism capable of sliding the second opening and closing cylinder;
a third drive mechanism capable of sliding the third opening and closing cylinder; and
a fourth drive mechanism capable of sliding the fourth opening and closing cylinder.

11. An operation method for a geothermal heat utilization system,
the system comprising:
a first well that includes a first upper opening that opens in an upper aquifer and a first lower opening that opens in a lower aquifer;
a second well that includes a second upper opening that opens in the upper aquifer and a second lower opening that opens in the lower aquifer;
a first pipe;
a second pipe;
a first heat exchanger connected to the first pipe; and
a second heat exchanger connected to the second pipe,
the method comprising:
a step of supplying underground water of the upper aquifer from the first upper opening to the second upper opening via the first pipe; and
a step of supplying underground water of the lower aquifer from the second lower opening to the first lower opening via the second pipe,
wherein hot water as the underground water to be supplied from one of the upper aquifer and the lower aquifer is pumped, and at the same time, cold water as the underground water to be supplied from the other of the upper aquifer and the lower aquifer is pumped.

* * * * *